(12) United States Patent
Lei

(10) Patent No.: US 12,483,472 B2
(45) Date of Patent: Nov. 25, 2025

(54) SLICE AUTHENTICATION METHOD AND APPARATUS

(71) Applicant: HUAWEI TECHNOLOGIES CO., LTD., Guangdong (CN)

(72) Inventor: Zhongding Lei, Singapore (SG)

(73) Assignee: Huawei Technologies Co., Ltd., Shenzhen (CN)

( * ) Notice: Subject to any disclaimer, the term of this patent is extended or adjusted under 35 U.S.C. 154(b) by 518 days.

(21) Appl. No.: 17/975,365

(22) Filed: Oct. 27, 2022

(65) Prior Publication Data

US 2023/0048066 A1 Feb. 16, 2023

Related U.S. Application Data

(63) Continuation of application No. PCT/CN2021/089747, filed on Apr. 25, 2021.

(30) Foreign Application Priority Data

Apr. 30, 2020 (CN) .......................... 202010368192.7

(51) Int. Cl.
*H04L 41/0806* (2022.01)
*H04L 41/0894* (2022.01)
(Continued)

(52) U.S. Cl.
CPC ...... *H04L 41/0806* (2013.01); *H04L 41/0894* (2022.05); *H04L 41/0895* (2022.05);
(Continued)

(58) Field of Classification Search
CPC ............ H04L 41/0806; H04L 41/0894; H04L 41/0895; H04L 41/40; H04L 41/0893; H04W 12/06; H04W 12/35; H04W 12/72
See application file for complete search history.

(56) References Cited

U.S. PATENT DOCUMENTS 11,039,315 B2 * 6/2021 Dowlatkhah ......... H04W 12/67
11,665,542 B2 * 5/2023 Tang ..................... H04W 12/06
455/411

(Continued)

FOREIGN PATENT DOCUMENTS

CN 110417563 A 11/2019
CN 112105015 A 12/2020
(Continued)

OTHER PUBLICATIONS

Wijethilaka, Shalitha, et al. "Blockchain-based secure authentication and authorization framework for robust 5g network slicing." IEEE Transactions on Network and Service Management (2024). (Year: 2024).*

(Continued)

*Primary Examiner* — Sharad Rampuria
(74) *Attorney, Agent, or Firm* — Fish & Richardson P.C.

(57) ABSTRACT

This application provides a slice authentication method and an apparatus. One example method includes: initiating, by a first network function (NF), slice authentication between a terminal device and an authentication server for a slice; sending, by the first NF, identification information of a first network, identification information of the slice, and identification information of the terminal device to the authentication server, wherein the first NF is an NF in the first network; and receiving, by the first NF, a slice authentication result for the slice, the identification information of the slice, and the identification information of the terminal device from the authentication server.

20 Claims, 18 Drawing Sheets

(51) Int. Cl.
H04L 41/0895 (2022.01)
H04L 41/40 (2022.01)
H04W 12/06 (2021.01)
H04W 12/30 (2021.01)

(52) U.S. Cl.
CPC ............ *H04L 41/40* (2022.05); *H04W 12/06* (2013.01); *H04W 12/35* (2021.01)

(56) References Cited

U.S. PATENT DOCUMENTS

| | | | | |
|---|---|---|---|---|
| 12,256,003 | B2* | 3/2025 | Kweon | H04W 12/069 |
| 2019/0053104 | A1* | 2/2019 | Qiao | H04L 41/0895 |
| 2019/0380031 | A1 | 12/2019 | Suthar et al. | |
| 2020/0053083 | A1* | 2/2020 | Kunz | H04W 12/72 |
| 2023/0232356 | A1* | 7/2023 | Johansson | H04W 12/06 455/411 |

FOREIGN PATENT DOCUMENTS

| | | | |
|---|---|---|---|
| WO | 2018202274 | A1 | 11/2018 |
| WO | 2020074542 | A1 | 4/2020 |

OTHER PUBLICATIONS

Wijethilaka, Shalitha, et al. "Blockchain-based secure authentication and authorization framework for robust 5g network slicing." IEEE transactions on network and service management 21.4 (2024): 3988-4005. (Year: 2024).*
3GPP TR 23.799 V14.0.0, "3rd Generation Partnership Project; Technical Specification Group Services and System Aspects; Study on Architecture for Next Generation System (Release 14)," Dec. 2016, 527 pages.
Extended European Search Report in European Appln No. 21796386.7, dated Aug. 18, 2023, 8 pages.
Nokia et al., "Draft for Network Slice Specific Authentication Procedures," 3GPP TSG-SA3 Meeting #97, S3-194541, Reno, US, Oct. 14-18, 2019, 11 pages.
3GPP TR 33.813 V0.3.0, "3rd Generation Partnership Project; Technical Specification Group Services and System Aspects; Security Aspects; Study on Security Aspects of Enhanced Network Slicing (Release 16)," Mar. 2019, 22 pages.
Qualcomm Incorporated, "23.501: Proposal for 5G System Identities," SA WG2 Meeting #118bis, S2-170181, Jan. 16-20, 2017, Spokane, WA, USA, 13 pages.
Office Action in Chiense Appln. No. 202010368192.7, dated Mar. 16, 2022, 9 pages.
Office Action in Chiense Appln. No. 202010368192.7, dated Aug. 12, 2022, 7 pages.
International Search Report and Written Opinion in International Appln. No. PCT/CN2021/089747, mailed on Jul. 15, 2021, 17 pages (with English translation).

* cited by examiner

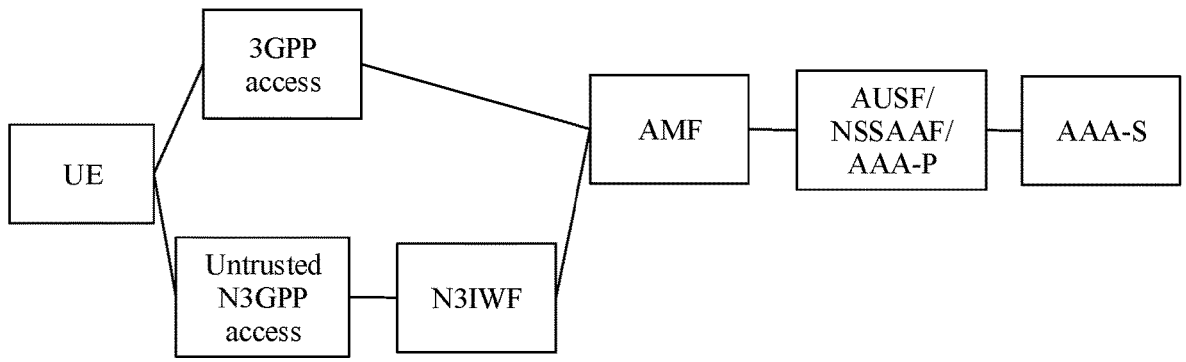

UE: Terminal device
3GPP: 3rd generation partnership project
N3GPP: Non-3GPP access
N3IWF: Non-3GPP interworking function
AMF: Access and mobility management function
AUSF: Authentication service function
NSSAAF: Network slice-specific authentication and authorization function
AAA-P: Authentication, authorization, and accounting proxy
AAA-S: Authentication, authorization, and accounting server

FIG. 3A

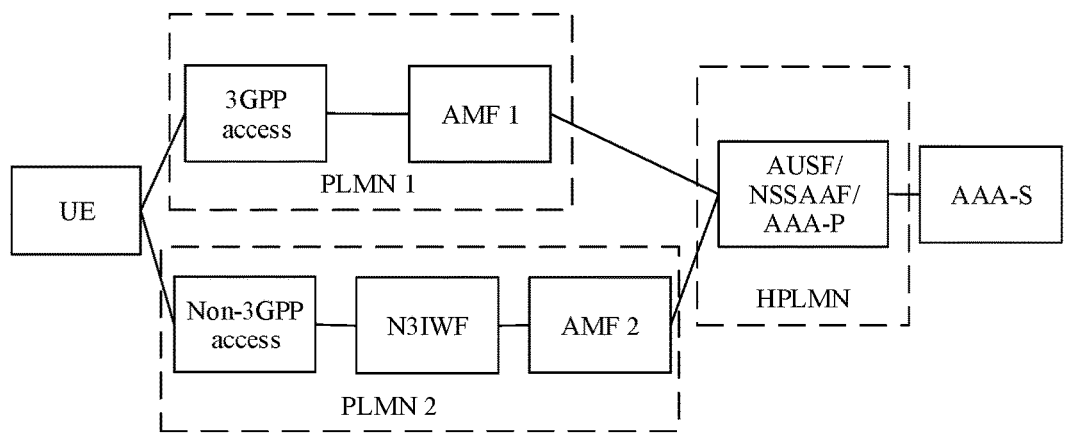

UE: Terminal device
3GPP: 3rd generation partnership project
N3GPP: Non-3GPP access
N3IWF: Non-3GPP interworking function
AMF: Access and mobility management function
PLMN: Public land mobile network
AUSF: Authentication service function
NSSAAF: Network slice-specific authentication and authorization function
AAA-P: Authentication, authorization, and accounting proxy
AAA-S: Authentication, authorization, and accounting server

FIG. 3B

SLICE AUTHENTICATION METHOD AND APPARATUS

CROSS-REFERENCE TO RELATED APPLICATIONS

This application is a continuation of International Application No. PCT/CN2021/089747, filed on Apr. 25, 2021, which claims priority to Chinese Patent Application No. 202010368192.7, filed on Apr. 30, 2020. The disclosures of the aforementioned applications are hereby incorporated by reference in their entireties.

TECHNICAL FIELD

This application relates to the field of communication technologies, and in particular, to a slice authentication method and an apparatus.

BACKGROUND

Before being allowed to access a slice, a terminal device needs to perform mutual authentication with the slice. Usually, the terminal device needs to be authenticated once or twice by a network before accessing the slice. First, a public land mobile network (public land mobile network, PLMN) needs to perform authentication based on a subscription permanent identifier (subscription permanent identifier, SUPI) that is used by the terminal device to subscribe to the PLMN. The authentication is referred to as primary authentication (primary authentication). Second, the PLMN needs to perform authentication based on a subscription identifier that is used by the terminal device to subscribe to a data network (data network, DN). This is referred to as slice authentication, secondary authentication, or the like.

When performing slice authentication, the terminal device may initiate slice authentication with an authentication server via a network function (network function, NF) in the network. When the terminal device accesses a same slice in a same network in different access manners, slice authentication is usually initiated by a same NF. For example, after the terminal device accesses a slice in one access manner, the terminal device needs to access the slice in another access manner. In this case, the terminal device may access the slice in the another access manner without performing slice authentication for the slice.

Therefore, how a terminal device initiates slice authentication via different networks or NFs in different networks is a problem that is under research by a person skilled in the art.

SUMMARY

This application provides a slice authentication method and an apparatus, to effectively improve slice authentication efficiency.

According to a first aspect, this application provides a slice authentication method. The method includes:

A first network function (network function, NF) initiates slice authentication between a terminal device and an authentication server for a slice. The first NF sends identification information of a first network, identification information of the slice, and identification information of the terminal device to the authentication server, where the first NF is an NF in the first network. The first NF receives a slice authentication result for the slice, the identification information of the slice, and the identification information of the terminal device from the authentication server.

In this embodiment of this application, in a slice authentication process, the identification information of the first network is carried, so that for one thing, the authentication server may distinguish between slice authentication initiated by different PLMNs for a same piece of S-NSSAI; and for another, the authentication server is prevented from confusing the slice authentication initiated by the different PLMNs for the same piece of S-NSSAI. The slice authentication initiated by the different PLMNs for the same piece of S-NSSAI is determined, so that a related NF (for example, the first NF) determines whether to re-initiate slice authentication for the S-NSSAI and the like. In this way, slice authentication efficiency is improved. In addition, the slice authentication initiated by the different PLMNs for the same piece of S-NSSAI is distinguished from each other, so that keys generated by the different PLMNs (or AMFs) may be further distinguished from each other, thereby avoiding a case in which the authentication server incorrectly updates a key.

In a possible implementation, that the first network function NF sends identification information of a first network, identification information of the slice, and identification information of the terminal device to the authentication server includes: The first NF sends the identification information of the first network, the identification information of the slice, and the identification information of the terminal device to the authentication server via a second NF. That the first NF receives a slice authentication result for the slice, the identification information of the slice, and the identification information of the terminal device from the authentication server includes: The first NF receives the slice authentication result for the slice, the identification information of the slice, and the identification information of the terminal device that are sent by the authentication server via the second NF.

In a possible implementation, the method further includes: The second NF stores authentication status information of the terminal device for the slice authentication that is initiated by the first network for the slice, where the authentication status information of the terminal device for the slice authentication that is initiated by the first network for the slice includes the slice authentication result for the slice, the identification information of the first network, the identification information of the slice, and the identification information of the terminal device.

In a possible implementation, the method further includes: The second NF sends, to a third NF, the authentication status information of the terminal device for the slice authentication that is initiated by the first network for the slice. The third NF receives the authentication status information of the terminal device for the slice authentication that is initiated by the first network for the slice, and stores the authentication status information of the terminal device for the slice authentication that is initiated by the first network for the slice.

In a possible implementation, the method further includes: A fourth NF sends a request message to the second NF or the third NF, where the request message is for requesting authentication status information of the terminal device for the slice, the authentication status information of the terminal device for the slice includes the authentication status information of the terminal device for the slice authentication that is initiated by the first network for the slice, and the fourth NF is an NF in a second network. The second NF or the third NF sends a response message to the fourth NF in response to the request message.

In a possible implementation, the method further includes: The first NF sends a request message to the second NF or the third NF, where the request message is for requesting authentication status information of the terminal device for the slice, the authentication status information of the terminal device for the slice includes the authentication status information of the terminal device for the slice authentication that is initiated by the first network for the slice. The second NF or the third NF sends a response message to the first NF in response to the request message.

In a possible implementation, the response message includes any one or more of the following: indication information, where the indication information indicates whether the fourth NF initiates slice authentication with the terminal device, or the indication information indicates whether the terminal device has completed performing slice authentication for the slice; the slice authentication result of the terminal device for the slice; and the authentication status information of the terminal device for the slice authentication that is initiated by the first network for the slice.

According to a second aspect, this application provides a slice authentication method. The method includes: An authentication server receives identification information of a first network, identification information of a slice, and identification information of a terminal device from a first network function NF, where the first NF is an NF in the first network. The authentication server performs slice authentication for the slice based on the identification information of the slice and the identification information of the terminal device. The authentication server sends a slice authentication result for the slice, the identification information of the slice, and the identification information of the terminal device to the first NF.

In a possible implementation, the method further includes: The authentication server stores authentication status information of the terminal device for slice authentication that is initiated by the first network for the slice, where the authentication status information of the terminal device for the slice authentication that is initiated by the first network for the slice includes the slice authentication result for the slice, the identification information of the first network, the identification information of the slice, and the identification information of the terminal device.

In a possible implementation, the method further includes: The authentication server determines, based on the authentication status information of the terminal device for the slice authentication that is initiated by the first network for the slice, whether to initiate slice authentication with the terminal device for the slice.

In a possible implementation, the method further includes: The authentication server receives a request message from the first NF or a fourth NF, where the request message is for requesting authentication status information of the terminal device for the slice. The authentication server sends a response message to the first NF or the fourth NF in response to the request message.

In a possible implementation, the response message includes any one or more of the following: indication information, where the indication information indicates whether the fourth NF initiates slice authentication with the terminal device, or the indication information indicates whether the terminal device has completed performing slice authentication for the slice; the slice authentication result of the terminal device for the slice; and the authentication status information of the terminal device for the slice authentication that is initiated by the first network for the slice.

According to a third aspect, this application provides a communication apparatus. The communication apparatus includes a processing unit and a transceiver unit. The processing unit is configured to initiate slice authentication between a terminal device and an authentication server for a slice. The transceiver unit is configured to send identification information of a first network, identification information of the slice, and identification information of the terminal device to the authentication server, where the communication apparatus is an NF in the first network. The transceiver unit is further configured to receive a slice authentication result for the slice, the identification information of the slice, and the identification information of the terminal device from the authentication server.

In a possible implementation, the transceiver unit is specifically configured to: send the identification information of the first network, the identification information of the slice, and the identification information of the terminal device to the authentication server via a second NF; and receive the slice authentication result for the slice, the identification information of the slice, and the identification information of the terminal device that are sent by the authentication server via the second NF.

In a possible implementation, the transceiver unit is further configured to: send a request message to the second NF or a third NF, where the request message is for requesting authentication status information of the terminal device for the slice, and the authentication status information of the terminal device for the slice includes authentication status information of the terminal device for the slice authentication that is initiated by the first network for the slice; and receive a response message from the second NF or the third NF.

For example, the first NF may determine, based on the response message, not to initiate slice authentication with the terminal device for the slice or the like. This is not limited in this embodiment of this application.

Optionally, the communication apparatus may include the first NF.

According to a fourth aspect, this application provides a communication apparatus. The communication apparatus includes a processing unit and a transceiver unit. The transceiver unit is configured to receive, from a first NF, authentication status information of a terminal device for slice authentication that is initiated by a first network for a slice. The processing unit is configured to store the authentication status information of the terminal device for the slice authentication that is initiated by the first network for the slice. Alternatively, the processing unit is configured to control a storage unit (for example, a memory) to store the authentication status information of the terminal device for the slice authentication that is initiated by the first network for the slice.

In a possible implementation, the transceiver unit is further configured to: receive a request message from a fourth NF (or the first NF), where the request message is for requesting authentication status information of the terminal device for the slice, the authentication status information of the terminal device for the slice includes the authentication status information of the terminal device for the slice authentication that is initiated by the first network for the slice, and the fourth NF is an NF in a second network; and send a response message to the fourth NF (or the first NF).

In a possible implementation, when the communication apparatus is a second NF, the transceiver unit is further configured to send, to a third NF, the authentication status information of the terminal device for the slice authentication that is initiated by the first network for the slice.

Optionally, the communication apparatus may include the second NF or the third NF.

According to a fifth aspect, this application provides a communication apparatus. The communication apparatus includes a transceiver unit and a processing unit. The transceiver unit is configured to receive and send a signal. The processing unit is configured to perform the following via the transceiver unit: sending a request message to a second NF or a third NF, where the request message is for requesting authentication status information of a terminal device for a slice, the authentication status information of the terminal device for the slice includes authentication status information of the terminal device for slice authentication that is initiated by a first network for the slice, and the communication apparatus is an NF in a second network; and receive a response message from the second NF or the third NF.

In a possible implementation, the response message includes any one or more of the following: indication information, where the indication information indicates whether a fourth NF initiates slice authentication with the terminal device, or the indication information indicates whether the terminal device has completed performing slice authentication for the slice; the slice authentication result of the terminal device for the slice; and the authentication status information of the terminal device for the slice authentication that is initiated by the first network for the slice.

Optionally, the communication apparatus may include the fourth NF.

According to a sixth aspect, this application provides a communication apparatus. The communication apparatus includes a transceiver unit and a processing unit. The transceiver unit is configured to receive identification information of a first network, identification information of a slice, and identification information of a terminal device from a first network function NF. The processing unit is configured to perform slice authentication for the slice based on the identification information of the slice and the identification information of the terminal device. The transceiver unit is further configured to send a slice authentication result for the slice, the identification information of the slice, and the identification information of the terminal device to the first NF.

In a possible implementation, the processing unit is configured to store authentication status information of the terminal device for slice authentication that is initiated by the first network for the slice. Alternatively, the processing unit controls a storage unit to store authentication status information of the terminal device for the slice authentication that is initiated by the first network for the slice. The authentication status information of the terminal device for the slice authentication that is initiated by the first network for the slice includes the slice authentication result for the slice, the identification information of the first network, the identification information of the slice, and the identification information of the terminal device.

In a possible implementation, the processing unit is further configured to determine, based on the authentication status information of the terminal device for the slice authentication that is initiated by the first network for the slice, whether to initiate slice authentication with the terminal device for the slice.

Optionally, the communication apparatus includes an authentication server.

According to a seventh aspect, this application provides a communication apparatus. The communication apparatus includes a processor, configured to execute a program stored in a memory. When the program is executed, the communication apparatus is enabled to perform the method performed by the first NF according to any one of the first aspect or the possible implementations of the first aspect. Alternatively, when the program is executed, the communication apparatus is enabled to perform the steps or functions according to any one of the third aspect or the possible implementations of the third aspect.

In a possible implementation, the memory is located outside the communication apparatus.

In a possible implementation, the memory is located inside the communication apparatus.

In a possible implementation, the communication apparatus further includes a transceiver. The transceiver is configured to receive a signal or send a signal.

According to an eighth aspect, this application provides a communication apparatus. The communication apparatus includes a processor, configured to execute a program stored in a memory. When the program is executed, the communication apparatus is enabled to perform the method performed by the second NF or the third NF according to any one of the first aspect or the possible implementations of the first aspect. Alternatively, when the program is executed, the communication apparatus is enabled to perform the steps or functions according to any one of the fourth aspect or the possible implementations of the fourth aspect.

In a possible implementation, the memory is located outside the communication apparatus.

In a possible implementation, the memory is located inside the communication apparatus.

In a possible implementation, the communication apparatus further includes a transceiver. The transceiver is configured to receive a signal or send a signal.

In this embodiment of this application, the communication apparatus may include the second NF or the third NF.

According to a ninth aspect, this application provides a communication apparatus. The communication apparatus includes a processor, configured to execute a program stored in a memory. When the program is executed, the communication apparatus is enabled to perform the method performed by the fourth NF according to any one of the first aspect or the possible implementations of the first aspect. Alternatively, when the program is executed, the communication apparatus is enabled to perform the steps or functions according to any one of the fifth aspect or the possible implementations of the fifth aspect.

In a possible implementation, the memory is located outside the communication apparatus.

In a possible implementation, the memory is located inside the communication apparatus.

In a possible implementation, the communication apparatus further includes a transceiver. The transceiver is configured to receive a signal or send a signal.

According to a tenth aspect, this application provides a communication apparatus. The communication apparatus includes a processor, configured to execute a program stored in a memory. When the program is executed, the communication apparatus is enabled to perform the method according to any one of the second aspect or the possible implementations of the second aspect. Alternatively, when the program is executed, the communication apparatus is enabled to perform the steps or functions according to any one of the sixth aspect or the possible implementations of the sixth aspect.

In a possible implementation, the memory is located outside the communication apparatus.

In a possible implementation, the memory is located inside the communication apparatus.

In a possible implementation, the communication apparatus further includes a transceiver. The transceiver is configured to receive a signal or send a signal.

According to an eleventh aspect, this application provides a communication apparatus. The communication apparatus includes a processor and an interface circuit. The interface circuit is configured to receive computer code and transmit the computer code to the processor. The processor runs the computer code to perform the corresponding method according to any one of the first aspect or the possible implementations of the first aspect. For example, the processor runs the computer code to perform the steps or functions performed by the first NF. For example, the processor runs the computer code to perform the steps or functions performed by the second NF. For example, the processor runs the computer code to perform the steps or functions performed by the third NF. For example, the processor runs the computer code to perform the steps or functions performed by the fourth NF.

According to a twelfth aspect, this application provides a communication apparatus. The communication apparatus includes a processor and an interface circuit. The interface circuit is configured to receive computer code and transmit the computer code to the processor. The processor runs the computer code to perform the corresponding method according to any one of the second aspect or the possible implementations of the second aspect.

According to a thirteenth aspect, this application provides a computer-readable storage medium. The computer-readable storage medium is configured to store a computer program. When the computer program is run on a computer, the method according to any one of the first aspect or the possible implementations of the first aspect is performed. For example, when the computer program is run on the computer, the method performed by the first NF according to any one of the first aspect or the possible implementations of the first aspect is performed. For example, when the computer program is run on the computer, the method performed by the second NF according to any one of the first aspect or the possible implementations of the first aspect is performed. For example, when the computer program is run on the computer, the method performed by the third NF according to any one of the first aspect or the possible implementations of the first aspect is performed. For example, when the computer program is run on the computer, the method performed by the fourth NF according to any one of the first aspect or the possible implementations of the first aspect is performed.

According to a fourteenth aspect, this application provides a computer-readable storage medium. The computer-readable storage medium is configured to store a computer program. When the computer program is run on a computer, the method according to any one of the second aspect or the possible implementations of the second aspect is performed.

According to a fifteenth aspect, this application provides a computer program product. The computer program product includes a computer program or computer code. When the computer program product runs on a computer, the method according to any one of the first aspect or the possible implementations of the first aspect is performed. For example, when the computer program product runs on the computer, the method performed by the first NF according to any one of the first aspect or the possible implementations of the first aspect is performed. For example, when the computer program product runs on the computer, the method performed by the second NF according to any one of the first aspect or the possible implementations of the first aspect is performed. For example, when the computer program product runs on the computer, the method performed by the third NF according to any one of the first aspect or the possible implementations of the first aspect is performed. For example, when the computer program product runs on the computer, the method performed by the fourth NF according to any one of the first aspect or the possible implementations of the first aspect is performed.

According to a sixteenth aspect, this application provides a computer program product. The computer program product includes a computer program or computer code. When the computer program product runs on a computer, the method according to any one of the second aspect or the possible implementations of the second aspect is performed.

According to a seventeenth aspect, this application provides a computer program. When the computer program is run on a computer, the method according to any one of the first aspect or the possible implementations of the first aspect is performed. For example, when the computer program is run on the computer, the method performed by the first NF according to any one of the first aspect or the possible implementations of the first aspect is performed. For example, when the computer program is run on the computer, the method performed by the second NF according to any one of the first aspect or the possible implementations of the first aspect is performed. For example, when the computer program is run on the computer, the method performed by the third NF according to any one of the first aspect or the possible implementations of the first aspect is performed. For example, when the computer program is run on the computer, the method performed by the fourth NF according to any one of the first aspect or the possible implementations of the first aspect is performed.

According to an eighteenth aspect, this application provides a computer program. When the computer program is run on a computer, the method according to any one of the second aspect or the possible implementations of the second aspect is performed.

According to a nineteenth aspect, this application provides a wireless communication system. The wireless communication system includes a first NF and an authentication server. Optionally, the wireless communication system further includes a second NF. Optionally, the wireless communication system may further include a third NF. Optionally, the wireless communication system may further include a fourth NF.

BRIEF DESCRIPTION OF DRAWINGS

FIG. 3A is a schematic diagram of a network architecture according to an embodiment of this application;

FIG. 3B is a schematic diagram of a network architecture according to an embodiment of this application;

DESCRIPTION OF EMBODIMENTS

Figure 1:
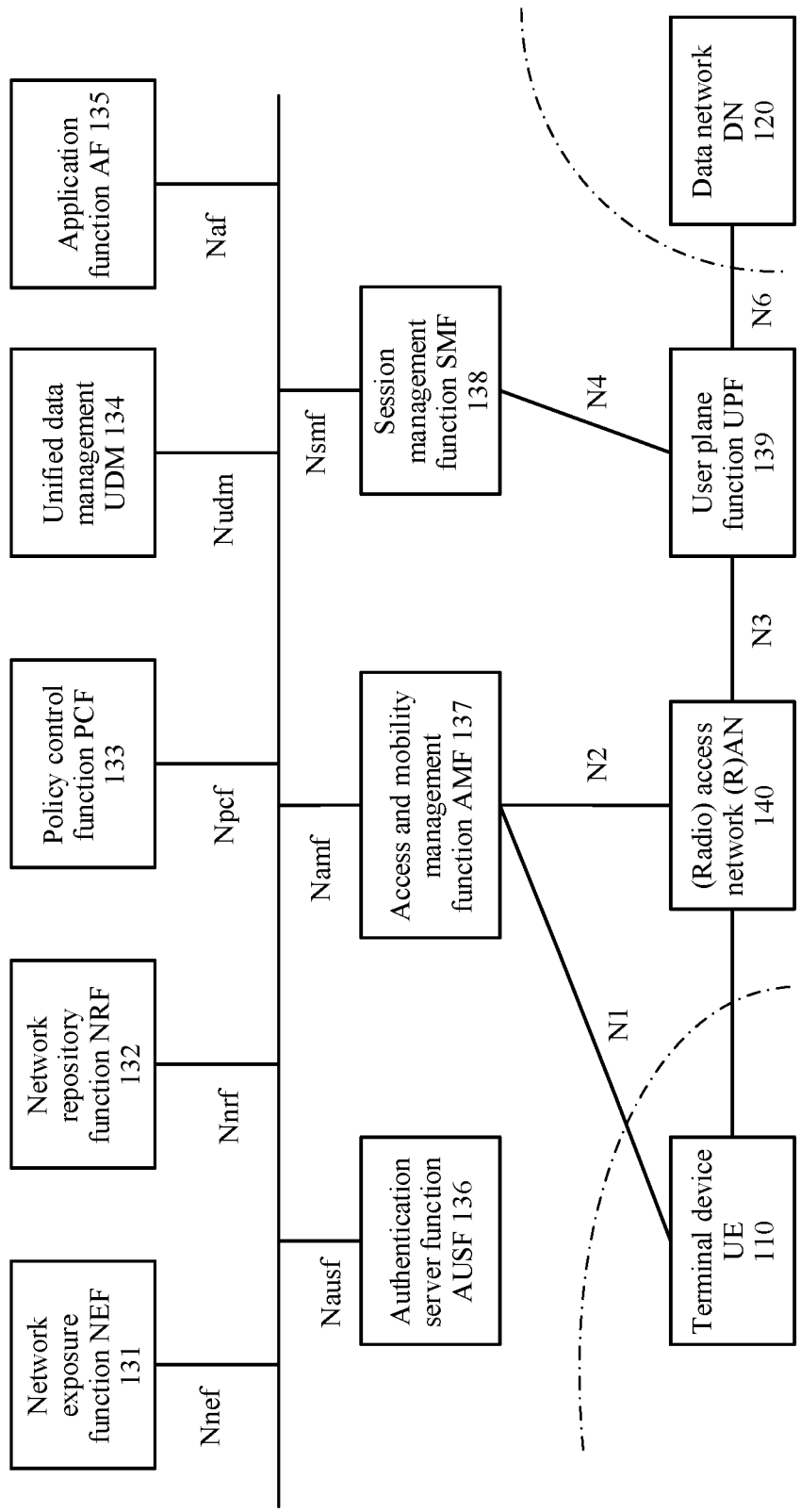
FIG. 1 is a schematic diagram of an architecture of a communication system according to an embodiment of this application.

To make the objectives, technical solutions, and advantages of this application clearer, the following further describes this application with reference to the accompanying drawings.

In the specification, claims, and accompanying drawings of this application, the terms "first", "second", and the like are intended to distinguish between different objects but do not indicate a particular order. In addition, the terms "including" and "having" and any other variants thereof are intended to cover a non-exclusive inclusion. For example, a process, a method, a system, a product, a device, or the like that includes a series of steps or units is not limited to the listed steps or units, but optionally further includes an unlisted step or unit, or optionally further includes another step or unit inherent to the process, the method, the product, the device, or the like.

"Embodiment" mentioned in this specification means that a particular feature, structure, or characteristic described with reference to the embodiment may be included in at least one embodiment of this application. The phrase shown in various locations in the specification may not necessarily refer to a same embodiment, and is not an independent or optional embodiment exclusive from another embodiment. It may be explicitly and implicitly understood by a person skilled in the art that embodiments described in the specification may be combined with another embodiment.

In this application, "at least one (item)" means one or more, "a plurality of" means two or more, "at least two (items)" means two or three or more. The term "and/or" is used to describe an association relationship between associated objects and represents that three relationships may exist. For example, "A and/or B" may represent the following three cases: Only A exists, only B exists, and both A and B exist, where A and B may be singular or plural. The character "/" usually indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

The following describes a communication system to which this application is applied.

The technical solutions provided in this application may be applied to various communication systems. In a communication system, a part operated by an operator may be referred to as a public land mobile network (public land mobile network, PLMN) (which may also be referred to as an operator network or the like). The PLMN is a network established and operated by a government or an operator approved by the government to provide a land mobile communication service for the public, and is mainly a public network in which a mobile network operator (mobile network operator, MNO) provides a mobile broadband access service for a user. The PLMN described in this application may be specifically a network compliant with a specification of the 3rd generation partnership project (3rd generation partnership project, 3GPP), which is referred to as a 3GPP network for short. The 3GPP network usually includes but is not limited to a 5th generation (5th generation, 5G) network (5G network for short), a 4th generation (4th generation, 4G) network (4G network for short), and the like. For ease of description, the PLMN is used as an example for description in embodiments of this application. Alternatively, the technical solutions provided in this application may be further applied to a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communication system, a 5th generation (5th generation, 5G) communication system, a new radio (new radio, NR) communication system, or another future communication system such as 6G.

With expansion of the mobile bandwidth access service, mobile networks are developing to better support diversified business models and meet requirements of more diversified application services and industries. For example, to provide better and more comprehensive services for more industries, a network architecture is adjusted for the 5G network compared with that of the 4G network. For example, the 5G network splits a mobility management entity (mobility management entity, MME) in the 4G network into a plurality of network functions including an access and mobility management function (access and mobility management function, AMF), a session management function (session management function, SMF), and the like.

FIG. 1 is a schematic diagram of a network architecture according to an embodiment of this application. A 5G network architecture that is defined in a 3GPP specification and that is based on a service-oriented architecture in a non-roaming scenario is used as an example. The network architecture may include three parts: a terminal device part, a PLMN, and a data network (data network, DN).

The terminal device part may include a terminal device 110, and the terminal device 110 may also be referred to as user equipment (user equipment, UE). The terminal device 110 in this application is a device having a wireless transceiver function, and may communicate with one or more core network (core network, CN) devices (which may also be referred to as core devices) via an access network device (which may also be referred to as an access device) in a radio access network (radio access network, RAN) 140. The terminal device 110 may also be referred to as an access terminal, a terminal, a subscriber unit, a subscriber station, a mobile station, a remote station, a remote terminal, a mobile device, a user terminal, a user agent, a user apparatus, or the like. The terminal device 110 may be deployed on land, including an indoor device, an outdoor device, a handheld device, or a vehicle-mounted device; or may be deployed on water (such as a ship); or may be deployed in the air (for example, on aircraft, a balloon, or a satellite). The terminal device 110 may be a cellular phone (cellular phone), a cordless phone, a session initiation protocol (session initiation protocol, SIP) phone, a smart phone (smart phone), a mobile phone (mobile phone), a wireless local loop (wireless local loop, WLL) station, a personal digital assistant (personal digital assistant, PDA), or the like. Alternatively, the terminal device 110 may be a handheld device or a computing device that has a wireless communication function, another device connected to a wireless modem, a vehicle-mounted device, a wearable device, an unmanned aerial vehicle device, a terminal in the Internet of Things or Internet of Vehicles, a terminal in any form in a 5G network or a future network, relay user equipment, a terminal in a future evolved PLMN, or the like. The relay user equipment may be, for example, a 5G residential gateway (residential gateway, RG). For example, the terminal device 110 may be a virtual reality (virtual reality, VR) terminal, an augmented reality (augmented reality, AR) terminal, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. A type or the like of the terminal device is not limited in embodiments of this application.

The PLMN may include a network exposure function (network exposure function, NEF) 131, a network repository function (network repository function, NRF) 132, a policy control function (policy control function, PCF) 133, a unified data management (unified data management, UDM) 134, an application function (application function, AF) 135, an authentication server function (authentication server function, AUSF) 136, an access and mobility management function (access and mobility management function, AMF) 137, a session management function (session management function, SMF) 138, a user plane function (user plane function, UPF) 139, a (radio) access network ((radio) access network, (R)AN) 140, and the like. In the PLMN, a part other than the (radio) access network 140 part may be referred to as a core network (core network, CN) part or a core network part.

A data network DN 120 may also be referred to as a packet data network (packet data network, PDN), and is usually a network outside the PLMN, for example, a third-party network. For example, the PLMN may access a plurality of data networks DNs 120, and a plurality of services may be deployed in the data networks DNs 120, to provide services such as a data service and/or a voice service for the terminal device 110. For example, the data network DN 120 may be a private network of a smart factory, a sensor installed in a workshop of the smart factory may be the terminal device 110, a control server of the sensor is deployed in the data network DN 120, and the control server may provide a service for the sensor. The sensor may communicate with the control server, to obtain instructions of the control server, transmit collected sensor data to the control server according to the instructions, and the like. For another example, the data network DN 120 may be an internal office network of a company, a mobile phone or a computer of an employee of the company may be the terminal device 110, and the mobile phone or the computer of the employee may access information, data resources, and the like on the internal office network of the company. The terminal device 110 may establish a connection to the PLMN through an interface (for example, an N1 interface in FIG. 1) provided by the PLMN, to use the services such as the data service and/or the voice service provided by the PLMN. The terminal device 110 may further access the data network DN 120 through the PLMN, to use an operator service deployed in the data network DN 120 and/or a service provided by a third party. The third party may be a service provider other than the PLMN and the terminal device 110, and may provide another service such as a data service and/or a voice service for the terminal device 110. A specific representation form of the third party may be specifically determined based on an actual application scenario, and is not limited herein.

For example, the following briefly describes a network function in the PLMN.

The (R)AN 140 is a subnet of the PLMN, and is an implementation system between a service node (or the network function) in the PLMN and the terminal device 110. To access the PLMN, the terminal device 110 first passes through the (R)AN 140, and then is connected to the service node in the PLMN via the (R)AN 140. The access network device in embodiments of this application is a device that provides a wireless communication function for the terminal device 110, and may also be referred to as an access device, a (R)AN device, a network device, or the like. For example, the access device includes but is not limited to: a next generation base station (next generation node base station, gNB) in a 5G system, an evolved NodeB (evolved NodeB, eNB) in an LTE system, a radio network controller (radio network controller, RNC), a NodeB (NodeB, NB), a base station controller (base station controller, BSC), a base transceiver station (base transceiver station, BTS), a home base station (home evolved NodeB, or home NodeB, HNB), a baseband unit (baseband unit, BBU), a transmission reception point (transmission reception point, TRP), a transmission point (transmission point, TP), a small cell base station (pico), a mobile switching center, a network device in a future network, or the like. It may be understood that a specific type of the access network device is not limited in this application. In systems using different radio access technologies, devices with functions of the access network device may have different names.

Optionally, in some deployment of the access device, the access device may include a central unit (central unit, CU), a distributed unit (distributed unit, DU), and the like. In some other deployment of the access device, the CU may be further split into a CU-control plane (control plane, CP), a CU-user plane (user plane, UP), and the like. In still some other deployment of the access device, the access device may alternatively be in an open radio access network (open radio access network, ORAN) architecture or the like. A specific deployment manner of the access device is not limited in this application.

The network exposure function NEF (which may also be referred to as an NEF network function or an NEF network functional entity) 131 is a control plane function provided by the operator. The NEF network function 131 securely exposes an external interface of the PLMN to a third party. When the SMF network function 138 needs to communicate with a third-party network function, the NEF network function 131 may serve as a relay for communication between the SMF network function 138 and the third-party network entity. When serving as the relay, the NEF network function 131 may translate identification information of a subscriber and identification information of the third-party network function. For example, when sending a subscription permanent identifier (subscription permanent identifier, SUPI) of the subscriber from the PLMN to the third party, the NEF network function 131 may translate the SUPI into an external identity (identity, ID) corresponding to the SUPI. Conversely, when sending an external ID (an ID of a third-party network entity) to the PLMN, the NEF network function 131 may translate the external ID into an SUPI.

The network repository function NRF 132 may be configured to maintain real-time information of all network function services in a network.

The policy control function PCF 133 is a control plane function provided by the operator, and is configured to provide a protocol data unit (protocol data unit, PDU) session policy for the session management function SMF 138. The policy may include a charging-related policy, a QoS-related policy, an authorization-related policy, and the like.

The unified data management UDM 134 is a control plane function provided by the operator, and is responsible for storing information such as a subscription permanent identifier (subscription permanent identifier, SUPI), a security context (security context), and subscription data of a subscriber in the PLMN. The subscriber in the PLMN may be specifically a subscriber using a service provided by the PLMN, for example, a subscriber using a terminal device SIM card of China Telecom, or a subscriber using a terminal device SIM card of China Mobile. For example, the SUPI of the subscriber may be a number of the terminal device SIM card. The security context may be a cookie (cookie), a token (token), or the like stored in a local terminal device (for example, a mobile phone). The subscription data of the subscriber may be a supporting service of the terminal device SIM card, for example, a traffic package of the mobile phone SIM card.

The application function AF 135 supports application influence on traffic routing, accessing a network exposure function, interacting with a policy framework for policy control, or the like.

The authentication server function AUSF 136 is a control plane function provided by the operator, and is usually for primary authentication, to be specific, authentication between the terminal device 110 (the subscriber) and the PLMN.

The access and mobility management function AMF 137 is a control plane network function provided by the PLMN, and is responsible for access control and mobility management when the terminal device 110 accesses the PLMN, for example, including functions such as mobility status management, allocation of a temporary user identity, and user authentication and authorization.

The session management function SMF 138 is a control plane network function provided by the PLMN, and is responsible for managing a protocol data unit (protocol data unit, PDU) session of the terminal device 110. The PDU session is a channel for transmitting a PDU, and the terminal device and the DN 120 needs to transmit a PDU to each other through the PDU session. The SMF 138 may be responsible for establishment, maintenance, deletion, and the like of the PDU session. The SMF 138 includes session-related functions, for example, session management (for example, session establishment, modification, and release, including tunnel maintenance between the UPF 139 and the (R)AN 140), selection and control of the UPF 139, service and session continuity (service and session continuity, SSC) mode selection, and roaming.

The user plane function UPF 139 is a gateway provided by the operator, and is a gateway for communication between the PLMN and the DN 120. The UPF 139 includes user plane—related functions, for example, data packet routing and transmission, packet detection, service usage reporting, quality of service (quality of service, QoS) processing, lawful interception, uplink packet detection, and downlink data packet storage.

The network functions in the PLMN shown in FIG. 1 may further include a network slice selection function (network slice selection function, NSSF) (not shown in FIG. 1), responsible for determining a network slice instance, selecting the AMF network function 137, and the like. The network functions in the PLMN shown in FIG. 1 may further include a unified data repository (unified data repository, UDR) and the like. Another network function included in the PLMN is not limited in this embodiment of this application.

In FIG. 1, Nnef, Nausf, Nnrf, Npcf, Nudm, Naf, Namf, Nsmf, N1, N2, N3, N4, and N6 are interface sequence numbers. For example, for meanings of the interface sequence numbers, refer to meanings defined in the 3GPP standard protocol. The meanings of the interface sequence numbers are not limited in this application. It should be noted that in FIG. 1, an example in which the terminal device 110 is UE is merely used for description. Names of interfaces between the network functions in FIG. 1 are also merely examples. During specific implementation, the names of the interfaces in the system architecture may be other names. This is not limited in this application.

The mobility management network function in this application may be the AMF 137 shown in FIG. 1, or may be another network function having the foregoing access and mobility management function AMF 137 in a future communication system. Alternatively, the mobility management network function in this application may be a mobility management entity (mobility management entity, MME) or the like in an LTE system.

For ease of description, in embodiments of this application, the access and mobility management function AMF 137 is referred to as an AMF for short, the unified data management UDM 134 is referred to as a UDM for short, and the terminal device 110 is referred to as UE. In other words, in embodiments of this application, an AMF described below may be replaced with a mobility management network function, a UDM described below may be replaced with a unified data management, and UE described below may be replaced with a terminal device. It may be understood that the replacement is also applicable to another network function that is not shown.

A service-oriented architecture and a universal interface are used for the network architecture (for example, a 5G network architecture) shown in FIG. 1. A conventional network element function is split into several self-contained, self-managed, and reusable network function service modules based on a network function virtualization (network function virtualization, NFV) technology. The schematic diagram of the network architecture shown in FIG. 1 may be understood as a schematic diagram of the service-oriented 5G network architecture in the non-roaming scenario. In this architecture, different network functions are combined in an orderly manner based on requirements of a specific scenario, so that a capability and a service of a network may be customized, thereby avoiding deploying a dedicated physical network for different services. With a network slicing technology, the operator may be capable of responding to customer requirements more flexibly and quickly and supporting flexible assignment of network resources.

The following describes a slice and slice authentication in this application.

The slices are, to put it simply, a plurality of virtual end-to-end networks obtained through slicing a physical network of an operator. These virtual networks (including a device, an access network, a transport network, and a core network in the network) are logically independent, so that a fault occurring on any one of the virtual networks does not affect the remaining of the virtual networks. To meet diversified requirements and slice isolation, independent management and operation and maintenance are required for services, and customized service functions and analysis capabilities are provided. Instances of different service types may be deployed on different network slices, or different instances of a same service type may also be deployed on different network slices. A slice may include a group of network functions (network functions, NFs) and/or a subnet, and the like. For example, a slice may include the subnet (R)AN 140, the AMF 137, the SMF 138, and the UPF 139 in FIG. 1. It may be understood that only one network function of each type is schematically illustrated in FIG. 1. During actual network deployment, there may be a plurality of, dozens of, or hundreds of network functions or subnets of each type. A plurality of slices may be deployed in a PLMN. Each slice may have different performance to meet requirements of different applications and vertical industries. The operator may "customize" a slice based on requirements of customers from the different vertical industries. The operator may alternatively allow some industrial customers to enjoy large autonomy and be partially involved in slice management and control functions. Slice-specific authentication is a network control function with limited industry customer participation. To be specific, authentication and authorization are performed for a slice to which a terminal device is to access, that is, "slice-specific authentication", which may also be referred to as "secondary authentication", "secondary authentication", or the like, and is referred to as "slice authentication" for short in this application.

Before being allowed to access a network or a slice, a terminal device needs to perform mutual authentication with the network and/or the slice to obtain authorization from the network and/or the slice. Usually, the terminal device needs to be authenticated and authorized once or twice by the network before accessing the network or the slice. First, a PLMN needs to perform authentication based on an SUPI that is used by the terminal device to subscribe to the PLMN. The authentication is referred to as primary authentication (primary authentication). Second, the PLMN needs to perform authentication based on a subscription identifier that is used by the terminal device to subscribe to a DN. This is referred to as slice authentication, secondary authentication, or the like.

FIG. 1 is used as an example. When a slice is deployed in a core network, and the UE 110 needs to access a specific slice, the UE 110 may provide a requested slice for the core network. The slice requested by the UE 110 may include a requested network slice selection assistance information (requested network slice selection assistance information, requested NSSAI) set. The NSSAI may include one or more pieces of single network slice selection assistance information (single network slice selection assistance information, S-NSSAI). One piece of S-NSSAI is for identifying one network slice type. This may also be understood as: The S-NSSAI is for identifying a slice; or the S-NSSAI is identification information of a slice. It may be understood that a slice in this application may also be referred to as a network slice, a network slice instance, S-NSSAI, or the like. A name of the slice is not limited in this application. For ease of understanding, in the following descriptions, the slice, the S-NSSAI, or the like are not strictly distinguished from each other in this application, and both the slice and the S-NSSAI may be used.

Further, after the UE 110 sends a registration request to the network, a core network function (such as the AMF network function 137 or the NSSF network function) selects, for the UE 110 based on information such as subscription data of the UE 110, the network slice requested by the UE 110, a roaming protocol, and a local configuration, a set of network slices that are allowed to be accessed. The set of network slices that are allowed to be accessed may be represented by allowed (allowed) NSSAI, and S-NSSAI included in the allowed NSSAI may be S-NSSAI that a current PLMN allows the UE 110 to access.

An example is used to describe the primary authentication and the secondary authentication. For example, with development of a vertical industry and the Internet of Things, the data network DN 120 (for example, a DN serving the vertical industry) outside the PLMN also has an authentication and authorization requirement for the UE 110 accessing the DN 120. For example, a commercial company provides a gaming platform to provide a game service for a player through a PLMN. Because the UE 110 used by the player accesses the gaming platform through the PLMN, the PLMN needs to perform authentication, authorization, or the like for an identity (an SUPI) of the UE 110, that is, the primary authentication. The game player is a customer of the commercial company, and the commercial company also needs to authenticate or authorize an identity of the game player. For example, the authentication or authorization performed for the identity of the game player may be slice-specific authentication, or in other words, the authentication is performed in a unit of a slice. In this case, the authentication may be referred to as slice authentication (slice authentication) or network slice—specific authentication and authorization (network slice—specific authentication and authorization, NSSAA).

It should be noted that an actual meaning of the slice authentication may be, for example, authentication performed between a terminal device and a third-party network (for example, a DN or an authentication server of the third-party network). A slice authentication result determines whether a PLMN authorizes a terminal device to access a slice provided by the PLMN. It should be further understood that the method applied to the slice authentication in this application is also applicable to a scenario such as session-specific secondary authentication (secondary authentication) or slice-specific secondary authentication. Details are not described herein.

The following describes in detail a slice authentication method provided in this application.

Figure 2A:
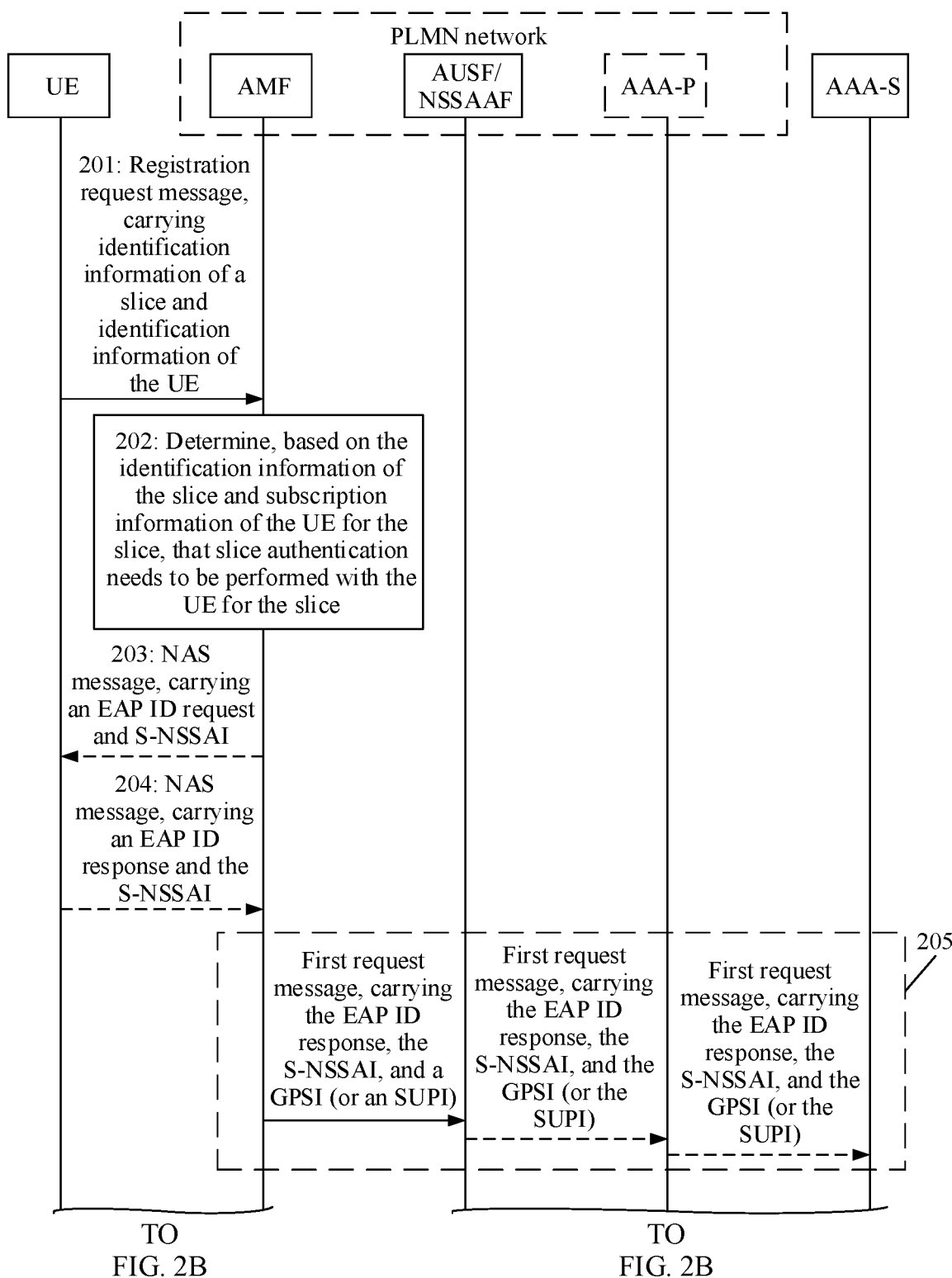
FIG. 2A, FIG. 2B, and FIG. 2C are a schematic flowchart of a slice authentication method according to an embodiment of this application.
Figure 2B:
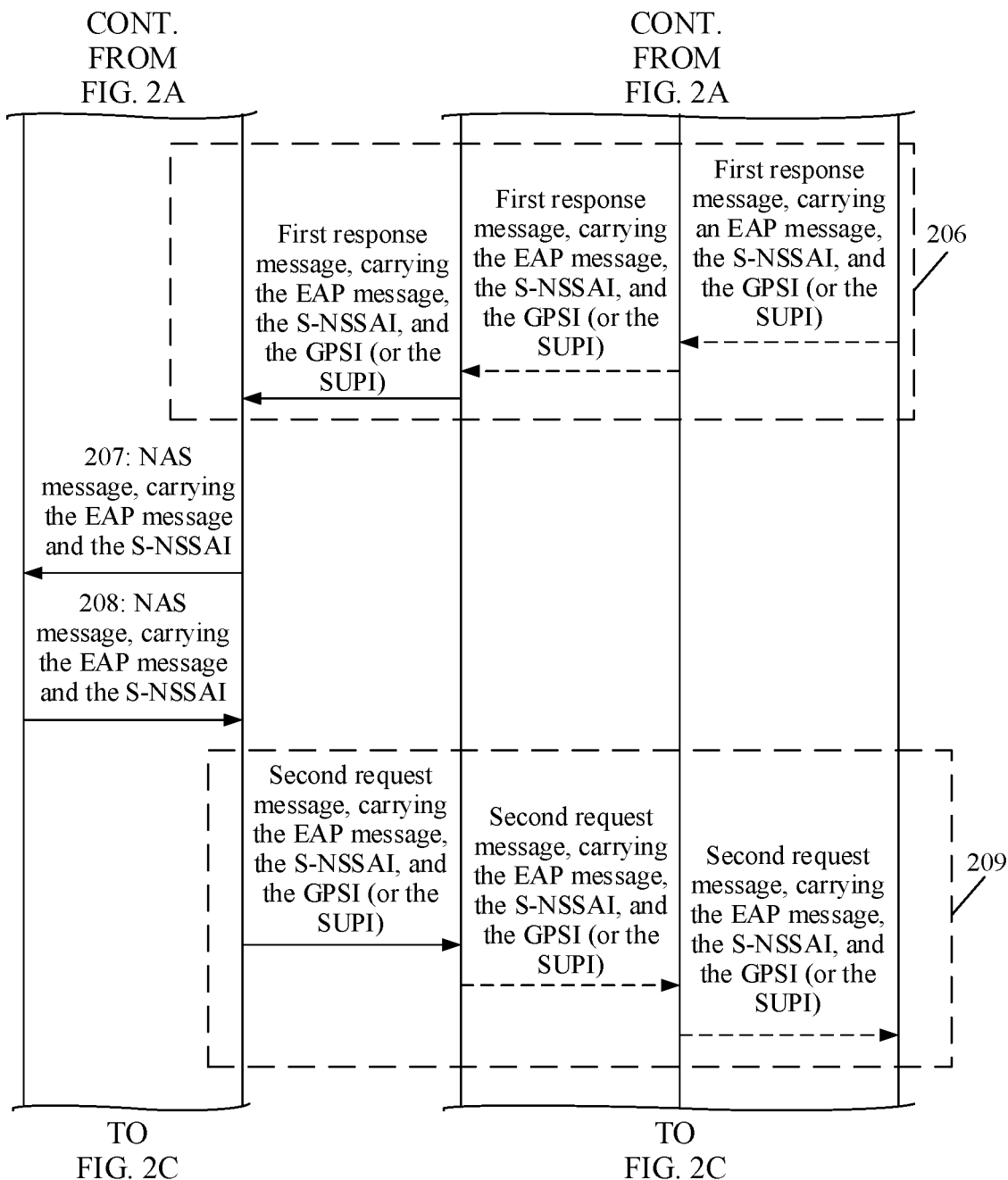
Figure 2C:
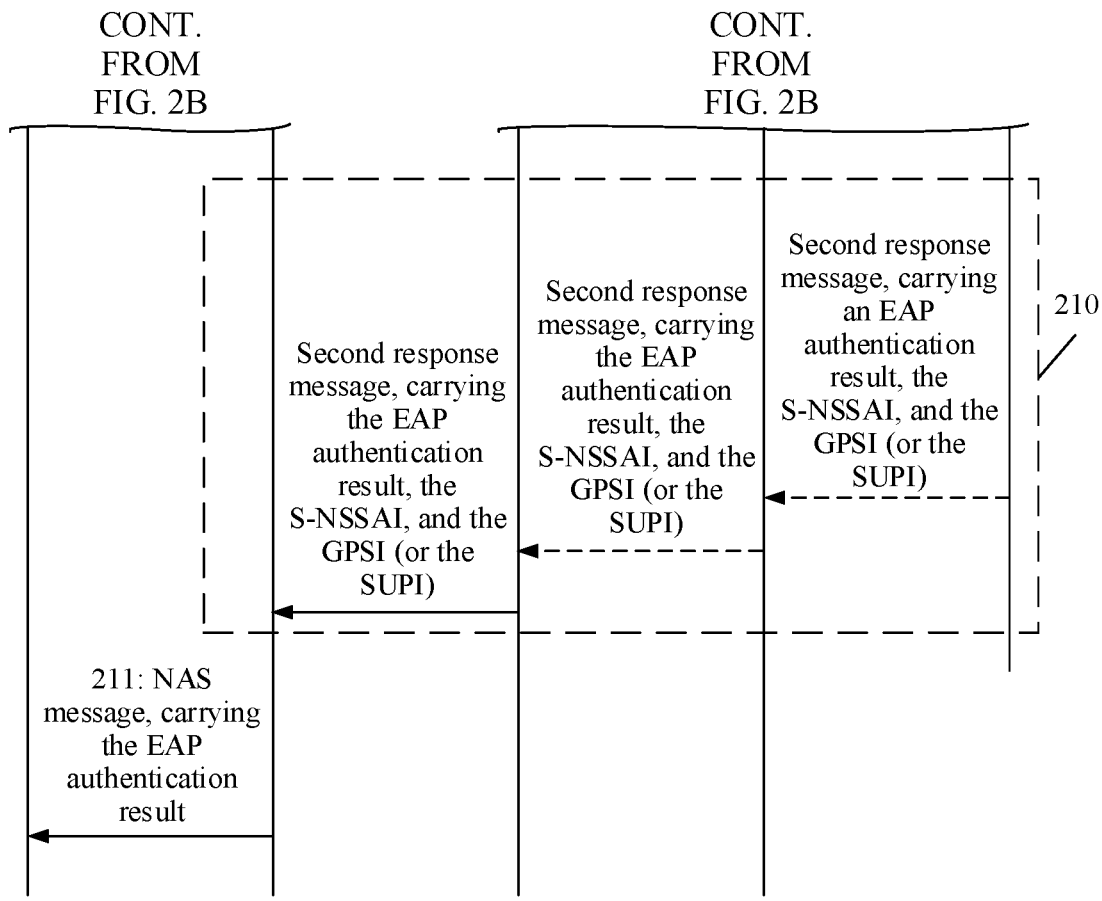

FIG. 2A, FIG. 2B, and FIG. 2C are a schematic flowchart of a slice authentication method according to an embodiment of this application. The method may be applied to the network shown in FIG. 1. It may be understood that FIG. 2A, FIG. 2B, and FIG. 2C show the slice authentication method. A primary authentication method between UE and a PLMN network is not limited in this embodiment of this application. In FIG. 2A, FIG. 2B, and FIG. 2C, a server responsible for slice authentication is an authentication, authorization, and accounting server (authentication, authorization, and accounting server, AAA-S). The AAA-S may be deployed in the PLMN network, or the AAA-S may be deployed outside the PLMN network. When the AAA-S is deployed outside the network, the UE may be connected to the AAA-S by using a proxy service provided by an AAA-proxy (AAA-proxy, AAA-P) deployed in the PLMN network, to implement authentication message exchange between the UE and the AAA-S. A network slice—specific authentication and authorization function (network slice—specific authentication and authorization function, NSSAAF) in FIG. 2A, FIG. 2B, and FIG. 2C is a network function that assists in completing the slice authentication. In another implementation, an AUSF, another NF, or the like may replace the NSSAAF to assist in completing the slice authentication. Therefore, a network function (such as the NSSAAF, the AUSF, or the another NF) that assists in completing the slice authentication is not limited in this embodiment of this application. Further, in some deployment manners, the AAA-P and the NSSAAF may be separately deployed; and in some other deployment manners, the AAA-P and the NSSAAF (or the AUSF) may be deployed together. Therefore, a deployment manner of the AAA-P and the NSSAAF (or the AUSF) is not limited in this embodiment of this application.

As shown in FIG. 2A, FIG. 2B, and FIG. 2C, the AAA-S is deployed outside the PLMN network. To be specific, the UE is connected to the AAA-S by using the proxy service provided by the AAA-P in the PLMN network, to implement the slice authentication. In addition, the AAA-P and the NSSAAF (or the AUSF) are separately deployed. However, this embodiment of this application is also applicable to another deployment case.

As shown in FIG. 2A, FIG. 2B, and FIG. 2C, the slice authentication method includes the following steps.

201: The UE sends a registration request message to an AMF, where the registration request message carries identification information of a slice and identification information of the UE. Accordingly, the AMF receives the registration request message.

For example, the identification information of the slice may include S-NSSAI of the slice. The identification information of the UE may include a subscription concealed identifier (subscription concealed identifier, SUCI), a globally unique temporary UE identity (globally unique temporary UE identity, GUTI), or the like of the UE. The identification information of the slice or the identification information of the UE is not limited in this embodiment of this application.

202: The AMF determines, based on the identification information of the slice and subscription information of the UE for the slice, whether the slice authentication needs to be performed with the UE for the slice.

In this embodiment of this application, the subscription information of the UE for the slice whose identifier is S-NSSAI may be obtained by the AMF from a UDM. The subscription information of the UE for the slice (whose identifier is the S-NSSAI) may indicate whether the network needs to perform slice authentication with the UE for the slice.

In other words, the AMF may determine, based on the identification information of the slice to be accessed by the UE, and based on the subscription information of the UE for the slice, whether the slice authentication with the UE for the slice needs to be performed or initiated. In addition, if the AMF records (or stores) a slice authentication result indicating that the UE has completed (for example, in another access manner, where the authentication succeeded or was rejected) the slice authentication for the slice, the UE does not need to perform slice authentication for the slice again.

If the slice authentication needs to be performed, the following procedure is performed. If the slice authentication does not need to be performed, the AMF may directly send, to the UE, a message indicating that the access to the slice is allowed (or the access to the slice is rejected) or the like. This is not limited in this embodiment of this application.

In a possible implementation, the method shown in FIG. 2A, FIG. 2B, and FIG. 2C may include step 203 and step 204.

203: The AMF sends, to the UE, an extensible authentication protocol (extensible authentication protocol, EAP) ID request (request) for the slice authentication. Accordingly, the UE receives the EAP ID request for the slice authentication.

The EAP is developed by the international organization for standardization and the international internet engineering task force (internet engineering task force, IETF). The EAP ID request may be carried in a non-access stratum (non-access stratum, NAS) message in a 3GPP network. The NAS message may further carry the identification information of the slice, for example, the S-NSSAI. The S-NSSAI may indicate that the EAP ID request is a slice authentication request for the S-NSSAI. Alternatively, the EAP ID request and the S-NSSAI may be carried in another type of (non-NAS) message. A carrying message is not limited in this application.

204: The UE sends an EAP ID response (response) to the AMF, where the EAP ID response may still be carried in a NAS message, and the NAS message may further carry the S-NSSAI.

It may be understood that, for ease of description, when the identification information of the slice is involved below, the identification information of the slice is represented by the S-NSSAI. The identification information of the UE may be represented by a generic public subscription identifier (generic public subscription identifier, GPSI) or an SUPI. However, this should not be construed as a limitation to this embodiment of this application. Alternatively, the EAP ID response and the S-NSSAI may be carried in another type of (non-NAS) message. A carrying message is not limited in this application.

205: The AMF sends a first request message to the AAA-S, where the first request message carries the EAP ID response, the S-NSSAI, and the GPSI or the SUPI. Accordingly, the AAA-S receives the first request message.

In this embodiment of this application, because the AUSF or the NSSAAF is not deployed together with the AAA-S, the AMF needs to first send the first request message to the AUSF or the NSSAAF. In addition, if the AAA-S is deployed outside the PLMN network, the AUSF or the NSSAAF needs to send the first request message to the AAA-P, and then the AAA-P sends the first request message to the AAA-S. For example, the AMF may send the first request message to the AUSF or the NSSAAF, and the AUSF or the NSSAAF receives the first request message. The AUSF or the NSSAAF sends the first request message to the AAA-P. Accordingly, the AAA-P receives the first request message. The AAA-P sends the first request message to the AAA-S. Accordingly, the AAA-S receives the first request message. If the AUSF or the NSSAAF and the AAA-P are deployed together, the AMF may send the first request message to the AUSF or the NSSAAF, and the AUSF or the NSSAAF receives the first request message. The AUSF or the NSSAAF sends the first request message to the AAA-S. Accordingly, the AAA-S receives the first request message. It may be understood that the descriptions are also applicable below.

It may be understood that the first request message in the foregoing step may alternatively have another name or be carried in a message of another protocol. This is not limited in this embodiment of this application. When different NFs forward the first request message, the first request message may alternatively have another name or be carried in a message of another protocol when passing through the different NFs. This is not limited in this application. For example, when the AAA-P sends the first request message to the AAA-S, the first request message may be further carried in an AAA protocol message.

206: The AAA-S sends a first response message to the AMF, where the first response message carries an EAP message, the S-NSSAI, and the GPSI (or the SUPI). Accordingly, the AMF receives the first response message.

It may be understood that when the AAA-S sends the first response message to the AAA-P, the first response message may alternatively be carried in an AAA protocol message. This is not limited in this embodiment of this application. A specific type of the EAP message is not limited in this application. For example, in different EAP authentication methods, the EAP message may have different names, types, or the like.

207: The AMF sends a NAS message to the UE, where the NAS message carries the EAP message and the S-NSSAI. Accordingly, the UE receives the NAS message. Alternatively, the EAP message and the S-NSSAI may be carried in another type of (non-NAS) message. A carrying message is not limited in this application.

208: The UE sends the NAS message to the AMF, where the NAS message carries the EAP message and the S-NSSAI. Accordingly, the AMF receives the NAS message. Alternatively, the EAP message and the S-NSSAI may be carried in another type of (non-NAS) message. A carrying message is not limited in this application.

209: The AMF sends a second request message to the AAA-S, where the second request message carries the EAP message, the S-NSSAI, and the GPSI (or the SUPI). Accordingly, the AAA-S receives the second request message.

It may be understood that step 206 to step 209 in FIG. 2A, FIG. 2B, and FIG. 2C may be performed for a plurality of times. For example, in different EAP methods, a quantity of times of performing step 206 to step 209 may be different. After step 206 to step 209, an EAP authentication procedure is completed between the AAA-S and the UE. Therefore, when the UE performs step 208 and the second request message reaches the AAA-S, the AAA-S may send an EAP authentication result to the UE.

It may be understood that in this embodiment of this application, the EAP authentication result may be further used to indicate a slice authentication result. For example, the EAP authentication result may include a result indicating successful EAP authentication or a result indicating failed EAP authentication. Accordingly, the slice authentication result may include a result indicating successful slice authentication or a result indicating failed slice authentication.

For ease of description, the EAP authentication result and the slice authentication result are not distinguished from each other in this embodiment of this application. In other words, the EAP authentication result in this embodiment of this application may alternatively be replaced with the slice authentication result. Similarly, the slice authentication result may alternatively be replaced with the EAP authentication result or the like. EAP authentication and slice authentication are not distinguished from each other in this embodiment of this application either. For example, the EAP authentication in this embodiment of this application may be replaced with the slice authentication, the slice authentication may be replaced with the EAP authentication, or the like. The descriptions are also applicable to another embodiment of this application.

210: The AAA-S sends a second response message to the AMF, where the second response message carries the EAP authentication result, the S-NSSAI, and the GPSI (or the SUPI). Accordingly, the AMF receives the second response message.

The S-NSSAI and the GPSI (or the SUPI) may indicate that the EAP authentication result is an authentication result of the UE for the S-NSSAI.

211: The AMF sends a NAS message to the UE, where the NAS message carries the EAP authentication result. Accordingly, the UE receives the NAS message. Alternatively, the EAP authentication result may be carried in another type of (non-NAS) message. A carrying message is not limited in this application.

The foregoing is the slice authentication method provided in this embodiment of this application. In addition, in a 5G communication system, UE may access a network in different types of access manners. For example, the different types of access manners may include 3GPP access (3GPP access, for example, access through 5G new radio) and non-3GPP access (non-3GPP access, N3GPP) (for example, through Wi-Fi or a fixed network). The non-3GPP access may be further classified into trusted (trusted) N3GPP access and untrusted (untrusted) N3GPP access. In a 5G communication system that complies with Release 16 and that is defined in a 3GPP protocol, when UE accesses a same network slice in a same PLMN network in different access manners, the UE uses a same AMF. As shown in FIG. 3A, UE uses a same AMF for both 3GPP access and non-3GPP access. An N3IWF in FIG. 3A may be a non-3GPP interworking function (non-3GPP interworking function).

Usually, if the UE needs to perform slice authentication, the UE only needs to perform slice authentication in any access manner. After the authentication succeeds, if the UE performs access in another access manner, the UE does not need to perform slice authentication for a same slice (S-NSSAI) again, in other words, slice authentication results in different access manners may be shared, and the slice authentication results may be stored in the AMF.

However, in a roaming scenario, when UE leaves a home network (home PLMN, HPLMN) of the UE and reaches a visiting network (visiting PLMN, VPLMN), a network function that processes a slice access request of the UE or initiates slice authentication is an AMF in the VPLMN. However, an AAA-S that actually performs authentication with the UE is still located in the HPLMN, or the UE needs to initiate slice authentication with the AAA-S through the HPLMN.

Further, when the roaming UE performs slice authentication with the AAA-S in the HPLMN in different access manners, because networks in the different access manners may belong to different VPLMNs, AMFs that initiate slice authentication are also different. As shown in FIG. 3B, for example, when UE roams to PLMN 1 (3GPP access) and attempts to access slice 1 (for example, S-NSSAI 1), the UE may initiate slice authentication with the UE for S-NSSAI 1 via AMF 1 in PLMN 1, in other words, the UE may perform slice authentication with an AAA-S via AMF 1. In addition, when the UE needs to access the slice in another access manner (for example, through a Wi-Fi network), AMF 2 in PLMN 2 (non-3GPP access) to which the Wi-Fi network belongs also attempts to initiate slice authentication between the UE and the AAA-S. That is, in a scenario shown in FIG. 3B, AMFs (AMF 1 and AMF 2) belonging to two different PLMNs (PLMN 1 and PLMN 2) attempt to initiate or perform slice authentication with the UE.

In other words, in the scenario shown in FIG. 3B, the AAA-S does not distinguish between slice authentication initiated by different PLMNs, and considers that there is only one PLMN by default. It can be learned from FIG. 2A, FIG. 2B, and FIG. 2C that the information such as the GPSI (or the SUPI) and the S-NSSAI in the message received by the AAA-S is the same for different PLMNs. Therefore, the AAA-S cannot determine whether a slice authentication request received by the AAA-S is a slice authentication (or re-authentication) request initiated by PLMN 2 or a slice authentication (or re-authentication) request initiated by PLMN 1.

For example, if slice authentication results in PLMN 1 and PLMN 2 are different (for example, slice authentication initiated by PLMN 1 succeeds, but authentication by PLMN 2 fails due to link congestion), the AAA-S confuses the slice authentication results, and cannot determine whether the slice authentication with the UE succeeds or fails (where links of PLMN 1 and PLMN 2 are independent, initiation time points are independent, and a sequence of producing the slice authentication results is not fixed, and therefore whether the authentication succeeds cannot be determined based on the sequence).

For example, after the slice authentication initiated by the UE in PLMN 1 succeeds, if the slice authentication initiated by PLMN 2 also succeeds, the AAA-S may consider by mistake that the slice authentication is still initiated by PLMN 1 (that is, consider that the second authentication is re-authentication by PLMN 1). Therefore, an authentication success record is updated, to be specific, a validity period of the slice authentication by PLMN 1 may be updated or prolonged (for example, a counter is reset).

For example, if PLMNs are not distinguished from each other in an EAP authentication method in which a key needs to be generated, a key for previous authentication may become invalid. For example, PLMN 1 initiates slice authentication which succeeds and generates a key, and the key is delivered to AMF 1 in PLMN 1. After PLMN 2 also initiates slice authentication which succeeds and generates a key, the key is delivered to AMF 2 in PLMN 2. Therefore, the AAA-S and the UE also update a key. To be specific, AMF 2 stores a new key, AMF 1 stores an old key, and AMF 1 cannot interact with the UE and the AAA-S by using the old key.

In view of this, this application provides a slice authentication method. The slice authentication method may be applied not only to a roaming scenario, but also to a case in which slice authentication is initiated by UE via different PLMNs.

Figure 4A:
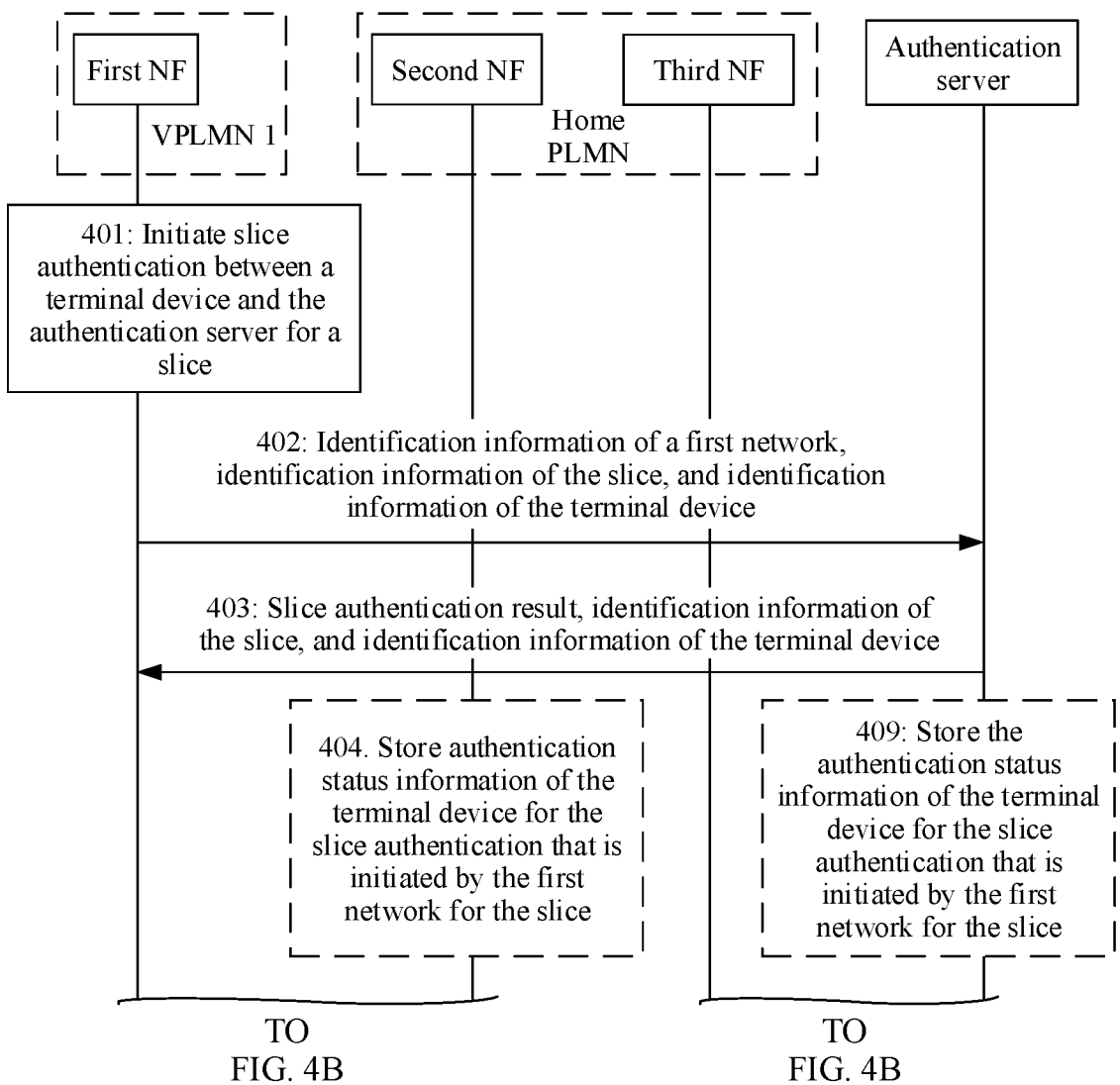
FIG. 4A and FIG. 4B are a schematic flowchart of a slice authentication method according to an embodiment of this application.
Figure 4B:
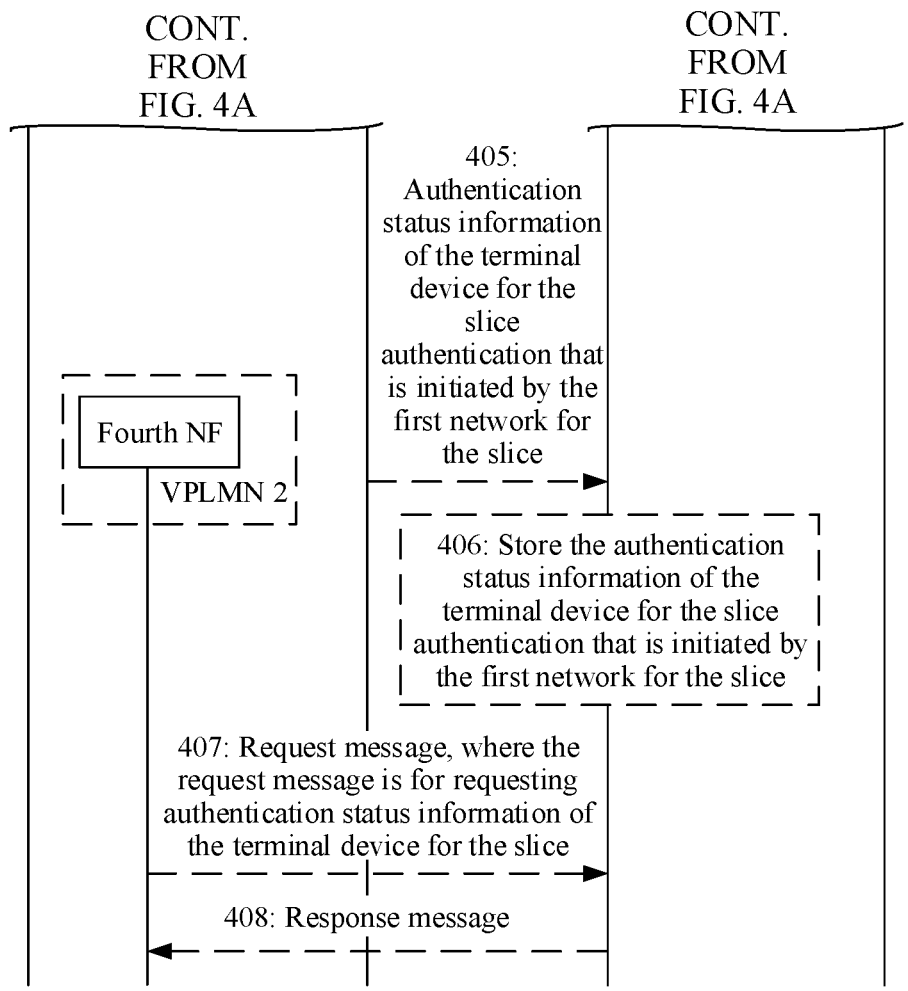

FIG. 4A and FIG. 4B are a schematic flowchart of a slice authentication method according to an embodiment of this application. The slice authentication method may be applied to a first NF, a second NF, and an authentication server. For example, the first NF may include an AMF in a VPLMN. The second NF may include an NSSAAF or an AUSF in an HPLMN. Alternatively, the second NF may include an NSSAAF and an AAA-P, or an AUSF and an AAA-P in an HPLMN. In other words, the second NF may be an NF when the NSSAAF (or the AUSF) and the AAA-P are deployed together, or the second NF may be the NSSAAF, the AAA-P, or the like when the NSSAAF (or the AUSF) and the AAA-P are separately deployed. The authentication server may include an AAA-S, and the AAA-S may be deployed inside the HPLMN or outside the HPLMN. Optionally, the slice authentication method may be further applied to a third NF. The third NF may be an NF having a network repository function. For example, the third NF may include a UDM or a UDR. Optionally, the slice authentication method may be further applied to a fourth NF. The fourth NF may include an AMF in a VPLMN. However, the fourth NF and the first NF may be located in different VPLMNs, to be specific, the fourth NF and the first NF may have a same function, but belong to the different VPLMNs.

As shown in FIG. 4A and FIG. 4B, the slice authentication method includes the following steps.

401: The first NF initiates slice authentication between a terminal device and the authentication server for a slice (namely, a slice corresponding to S-NSSAI).

For how the first NF initiates slice authentication between the terminal device and the authentication server, refer to another embodiment of this application. Details are not described herein. For example, the slice authentication procedure may be shown in FIG. 2A, FIG. 2B, and FIG. 2C, or any method shown in FIG. 5A, FIG. 5B, and FIG. 5C to FIG. 8A and FIG. 8B.

402: The first NF sends identification information of a first network, identification information of the slice, and identification information of the terminal device to the authentication server, where the first NF is an NF in the first network. Accordingly, the authentication server receives the identification information of the first network, the identification information of the slice, and the identification information of the terminal device.

In this embodiment of this application, the identification information of the first network sent by the first NF may be alternatively replaced with identification information of a network function in the first network. For example, the identification information of the first network may include an identity of a PLMN and/or an identity of a serving network. The identity of the PLMN may include an ID of the PLMN, and the identity of the serving network may include an ID (SN-ID) of the serving network (serving network), a serving network name (serving network name, SNN), a network identifier (network identifier, NID), or the like. The identification information of the network function in the first network may include an identity of the first NF. The identity of the first NF may include an ID of the AMF, an AMF name, a globally unique AMF identifier (globally unique AMF identifier, GUAMI), or the like. Alternatively, the first NF may send both the identification information of the first network and the identification information of the NF in the first network to the authentication server.

For ease of description, in this application, "the identification information of the first network" and "the identification information of the NF in the first network" are not distinguished from each other, and are collectively referred to as "the identification information of the first network".

For example, the identification information of the slice may include the S-NSSAI of the slice, a slice instance ID, or the like. The identification information of the UE may include a GPSI, an SUPI, or the like of the UE. The identification information of the slice or the identification information of the UE is not limited in this embodiment of this application.

Optionally, the first NF may send the identification information of the first network, the identification information of the slice, and the identification information of the terminal device to the authentication server via the second NF.

It may be understood that the identification information of the first network, the identification information of the slice, and the identification information of the terminal device may be carried in a request message, for example, a third request message or a fourth request message in another embodiment of this application. Alternatively, the identification information of the first network, the identification information of the slice, and the identification information of the terminal device may be carried in a message of another protocol. This is not limited in this embodiment of this application.

403: The authentication server sends a slice authentication result for the slice, the identification information of the slice, and the identification information of the terminal device to the first NF.

Optionally, the first NF may further receive the slice authentication result for the slice, the identification information of the slice, and the identification information of the terminal device that are sent by the authentication server via the second NF.

In this embodiment of this application, in a process in which the authentication server performs slice authentication for the slice, the identification information of the first network is carried, so that for one thing, the authentication server may distinguish between slice authentication initiated by different PLMNs for a same piece of S-NSSAI; and for another, the authentication server is prevented from confusing the slice authentication initiated by the different PLMNs for the same piece of S-NSSAI. In addition, the slice authentication initiated by the different PLMNs for the same piece of S-NSSAI is distinguished from each other, so that the authentication server may further distinguish between keys generated by the different PLMNs (or AMFs), to avoid a case in which the authentication server incorrectly updates a key.

In a possible implementation, the method shown in FIG. 4A and FIG. 4B may further include step 404.

404: The second NF stores authentication status information of the terminal device for the slice authentication that is initiated by the first network for the slice.

The authentication status information of the terminal device for the slice authentication that is initiated by the first network for the slice includes the slice authentication result for the slice, the identification information of the first network, the identification information of the slice, and the identification information of the terminal device. In other words, the second NF may store the slice authentication result for the slice, the identification information of the first network, the identification information of the slice, and the identification information of the terminal device. It may be understood that the descriptions of the authentication status information of the terminal device for the slice authentication that is initiated by the first network for the slice are also applicable to other parts in embodiments of this application.

In this embodiment of this application, by storing the authentication status information of the terminal device for the slice authentication that is initiated by the first network for the slice, the second NF may provide beneficial information for subsequent slice authentication. For the method, refer to step 407 and step 408; or refer to a related method shown in FIG. 6A and FIG. 6B; or refer to the method shown in FIG. 5A, FIG. 5B, and FIG. 5C, FIG. 7A and FIG. 7B, and FIG. 8A and FIG. 8B. Details are not described herein.

In a possible implementation, the method shown in FIG. 4A and FIG. 4B may further include step 405 and step 406.

405: The second NF sends, to the third NF, the authentication status information of the terminal device for the slice authentication that is initiated by the first network for the slice. Accordingly, the third NF receives the authentication status information of the terminal device for the slice authentication that is initiated by the first network for the slice.

406: The third NF stores the authentication status information of the terminal device for the slice authentication that is initiated by the first network for the slice.

It may be understood that, if there is no interface between the second NF and the third NF, the second NF may alternatively send, to the third NF via the first NF, the authentication status information of the terminal device for the slice authentication that is initiated by the first network for the slice.

In this embodiment of this application, by storing the authentication status information of the terminal device for the slice authentication that is initiated by the first network for the slice, the third NF may provide beneficial information for subsequent slice authentication. For the method, refer to step 407 and step 408; or refer to a related method shown in FIG. 8A and FIG. 8B. Details are not described herein.

407: The fourth NF sends a request message to the second NF or the third NF, where the request message is for requesting authentication status information of the terminal device for the slice, and the fourth NF is an NF in a second network. Accordingly, the second NF or the third NF receives the request message.

408: The second NF or the third NF sends a response message to the first NF. Accordingly, the first NF receives the response message.

It may be understood that, if the authentication status information of the terminal device for the slice authentication that is initiated by the first network for the slice is stored in the second NF, when the fourth NF sends the request message to the second NF, the fourth NF may obtain, from the response message, indication information related to the slice authentication initiated by the first network, and the like. For example, the request message may include the identification information of the terminal device, the identification information of the slice, identification information of the second network, and the like. For the foregoing identification information, refer to the descriptions of step 401. Details are not described herein again. For example, the request message may be a sixth request message or the like shown below.

If the authentication status information of the terminal device for the slice authentication that is initiated by the first network for the slice is stored in the third NF, the fourth NF may send the request message to the third NF. For example, the request message may be a fifth request message or the like shown in FIG. 8A and FIG. 8B.

Optionally, the response message includes any one or more of the following:
- indication information, where the indication information indicates whether the fourth NF needs to initiate slice authentication with the terminal device for the slice, or the indication information indicates whether the terminal device has completed performing slice authentication for the slice;
- the slice authentication result of the terminal device for the slice; and
- the authentication status information of the terminal device for the slice authentication that is initiated by the first network for the slice.

In some implementations, the indication information may indicate whether slice authentication needs to be initiated with the terminal device. For example, the indication information may indicate the fourth NF to continue performing or initiate slice authentication. In some other implementations, the response message may carry the authentication status information of the terminal device for the slice authentication that is initiated by the first network (and/or another network) for the slice. For example, the response message may carry the S-NSSAI, the GPSI (or the SUPI), the PLMN-ID (or the AMF-ID) (for example, the ID of the first network), and the slice authentication result. For another example, the response message may further carry information such as a reason why the slice authentication result for the S-NSSAI is a failure. Optionally, the response message may carry a slice authentication result (for example, carrying S-NSSAI, a PLMN-ID (or an AMF-ID), or a GPSI (or an SUPI) and a slice authentication result) that is most recently (or newly) stored by the second NF or the third NF and that is of the UE for slice authentication that is initiated by the first network for the S-NSSAI; or may carry authentication status information that is stored by the second NF or the third NF and that is of the terminal device for slice authentication that is initiated by all PLMN networks for the S-NSSAI.

For specific descriptions of the foregoing request message and/or response message, refer to the following. Details are not described herein.

In a possible implementation, the method shown in FIG. 4A and FIG. 4B may further include step 409.

409: The authentication server stores the authentication status information of the terminal device for the slice authentication that is initiated by the first network for the slice.

For specific descriptions of storing, by the authentication server, the authentication status information of the terminal device for the slice authentication that is initiated by the first network for the slice, refer to the methods shown in FIG. 5A, FIG. 5B, and FIG. 5C to FIG. 8A and FIG. 8B. For example, refer to step 515 shown in FIG. 5A, FIG. 5B, and FIG. 5C, step 615 shown in FIG. 6A and FIG. 6B, and the like.

Optionally, the authentication server may further determine, based on the authentication status information of the terminal device for the slice authentication that is initiated by the first network for the slice, whether to initiate slice authentication with the terminal device for the slice. Optionally, when the fourth NF sends a request message to the authentication server, the authentication server may determine, based on the authentication status information of the terminal device for the slice authentication that is initiated by the first network for the slice, whether to initiate slice authentication with the terminal device for the slice via the second network (namely, a network in which the fourth NF is located). The request message carries the identification information of the terminal device, the identification information of the slice, and the identification information of the second network.

In other words, when the authentication status information of the terminal device for the slice authentication that is initiated by the first network for the slice may be stored in the authentication server, the fourth NF may further send the request message to the authentication server. For example, for specific descriptions of the request message, refer to the method shown in FIG. 6A and FIG. 6B. Details are not described herein.

It may be understood that for a specific method shown in FIG. 4A and FIG. 4B, refer to embodiments shown below.

For better understanding of the method shown in FIG. 4A and FIG. 4B, this application further provides a slice authentication method, as shown in FIG. 5A, FIG. 5B, and FIG. 5C to FIG. 8A and FIG. 8B.

It may be understood that an AAA-P and an NSSAAF (or an AUSF) are deployed together in the following embodiments that are shown. However, this application is not limited thereto. Whether an AAA-S is deployed inside or outside a PLMN network is not limited in this application either.

Figure 5A:
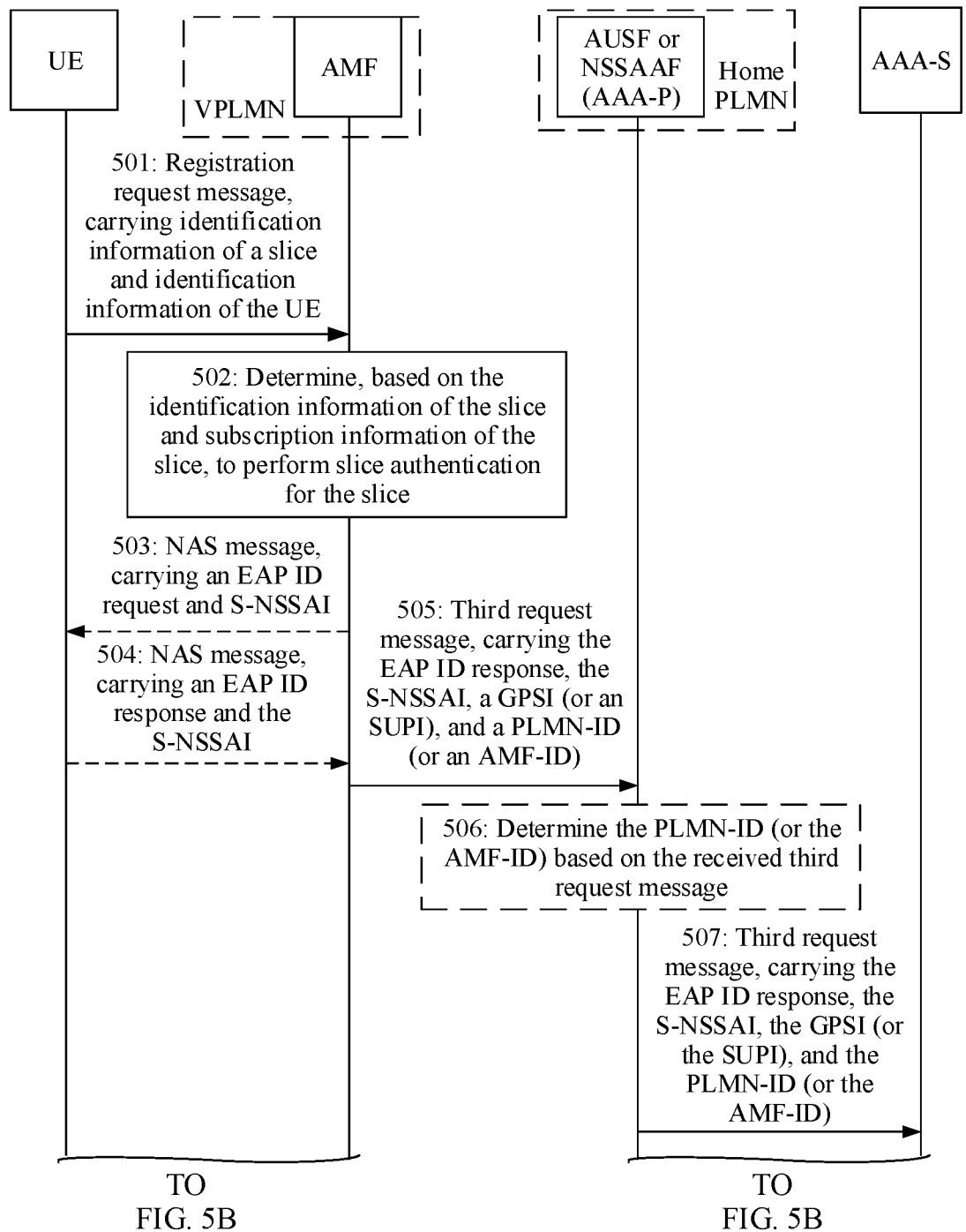
FIG. 5A, FIG. 5B, and FIG. 5C are a schematic flowchart of a slice authentication method according to an embodiment of this application.
Figure 5B:
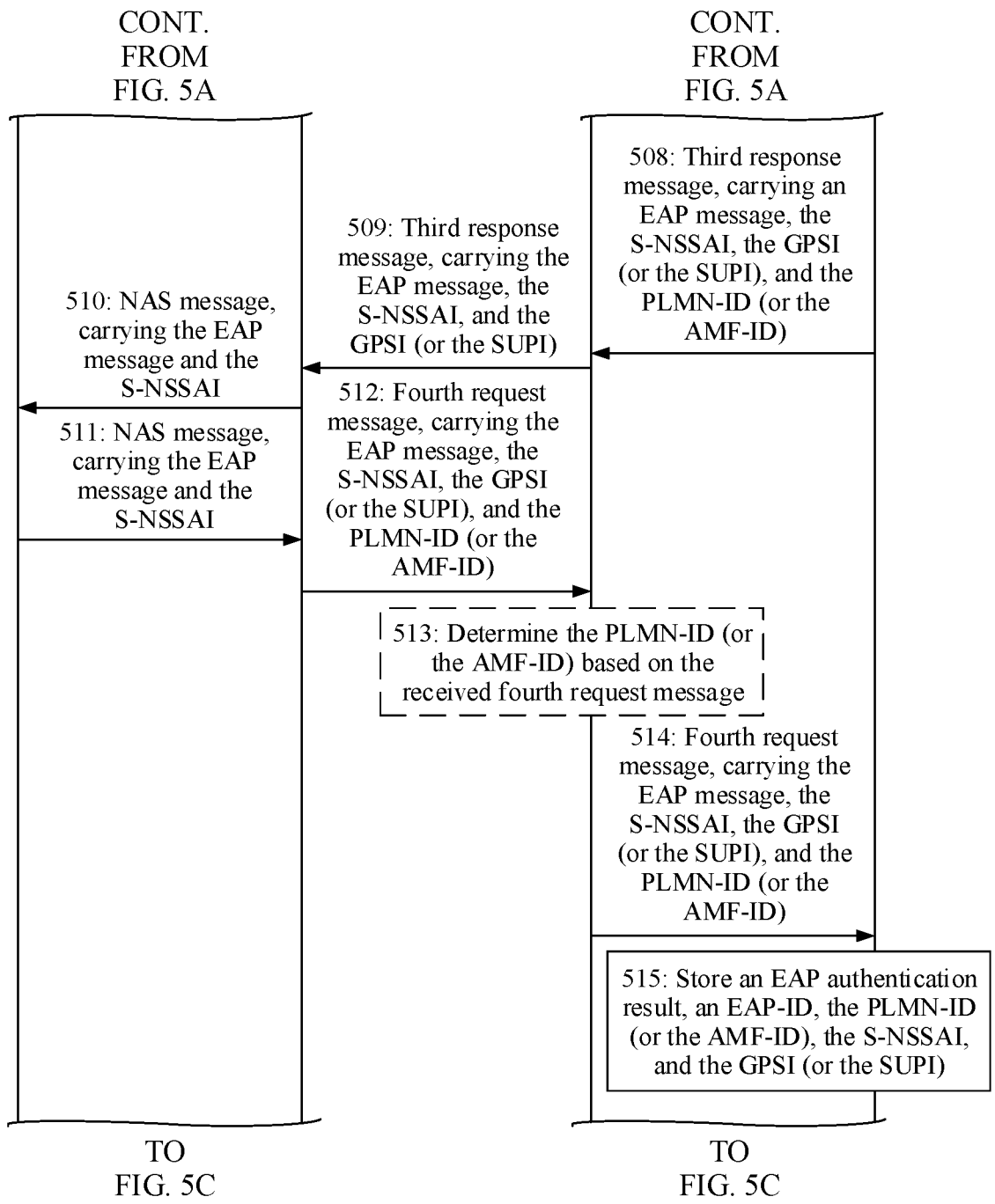
Figure 5C:
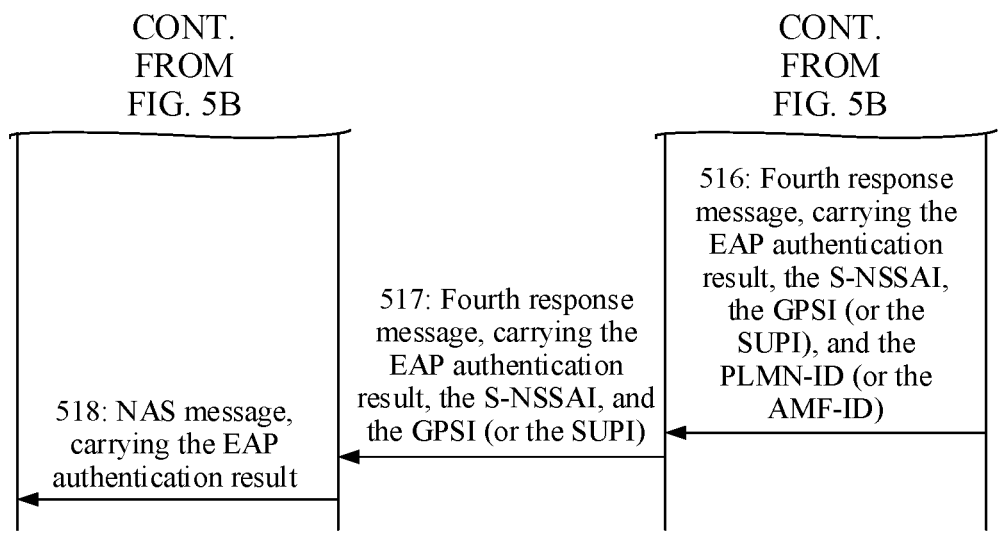

FIG. 5A, FIG. 5B, and FIG. 5C are a schematic flowchart of a slice authentication method according to an embodiment of this application. As shown in FIG. 5A, FIG. 5B, and FIG. 5C, the method includes the following steps.

501: UE sends a registration request message to an AMF, where the registration request message carries identification information of a slice and identification information of the UE. Accordingly, the AMF receives the registration request message.

502: The AMF determines, based on the identification information of the slice and subscription information of the slice, to perform slice authentication for the slice.

The following describes an example in which the slice authentication needs to be performed for the slice. However, this application is also applicable to another case (refer to the descriptions in FIG. 2A, FIG. 2B, and FIG. 2C).

503: The AMF sends an EAP ID request for the slice authentication to the UE. Accordingly, the UE receives the EAP ID request for the slice authentication.

504: The UE sends an EAP ID response to the AMF, where the EAP ID response may still be carried in a NAS message, and the NAS message may further carry S-NSSAI.

It may be understood that for specific descriptions of step 501 to step 504, refer to the descriptions of step 201 to step 204 in FIG. 2A, FIG. 2B, and FIG. 2C. Details are not described herein again.

505: The AMF sends a third request message to an NSSAAF (or an AUSF), where the third request message carries the EAP ID response, the identification information of the slice, the identification information of the UE, and identification information of a network or identification information of a network function. Accordingly, the NSSAAF receives the third request message.

In this embodiment of this application, for the identification information of the slice, refer to the foregoing descriptions. For example, the identification information of the slice may include the S-NSSAI, and the identification information of the UE may include a GPSI, an SUPI, or the like. The identification information of the network may include an ID (which is referred to as a PLMN-ID) of a PLMN, an ID (SN-ID) of a serving network (serving network), a serving network name (serving network name, SNN), a network identifier (network identifier, NID), or the like. The identification information of the network function may include an ID (which is referred to as an AMF-ID) of the AMF, an AMF name (AMF name), a globally unique AMF identifier (globally unique AMF identifier, GUAMI), or the like. In this application, only the PLMN-ID is used as an example of the identification information of the network for description, and only the AMF-ID is used as an example of the identification information of the network function for description. However, this should not be construed as a limitation to this embodiment of this application.

For ease of description, in this application, "the identification information of the network" (for example, the PLMN-ID) and "the identification information of the network function" (for example, the AMF-ID) are not distinguished from each other, and are collectively referred to as "the identification information of the network".

For example, the PLMN-ID may be understood as the ID of PLMN 1 in FIG. 3B, and the AMF-ID may be understood as the ID of AMF 1 in FIG. 3B.

It may be understood that when the AMF-ID is used as the identification information of the network, an additional operation or the like may be introduced. For example, there may be a plurality of AMFs in a PLMN, and an AMF that provides a service for UE may change (but the PLMN does not change). In this case, each time when the AMF changes, all related NFs or network elements (such as an AAA-S and an NSSAAF/AUSF) need to be notified to keep synchronized.

Optionally, the third request message may alternatively not carry the identification information of the network. In this case, the method shown in FIG. 5A, FIG. 5B, and FIG. 5C may further include step 506.

506: The NSSAAF (or the AUSF) determines the identification information (for example, the PLMN-ID or the AMF-ID) of the network based on the received third request message.

Usually, to ensure authenticity of a message sent by the AMF, the message includes a token (token) for verifying the AMF. The token may be used to indicate a source of the message, to be specific, the token may indicate the ID of the AMF that sends the message, and further obtain the ID of the PLMN. In other words, after receiving the third request message, the NSSAAF (or the AUSF) may determine the identification information of the network based on the token included in the third request message.

It may be understood that descriptions of step 505 and step 506 are also applicable to the following embodiments.

507: The NSSAAF (or the AUSF) sends the third request message to an AAA-S, where the third request message carries the EAP ID response, the S-NSSAI, the GPSI (or the SUPI), and the PLMN-ID (or the AMF-ID). Accordingly, the AAA-S receives the third request message.

508: The AAA-S sends a third response message to the NSSAAF (or the AUSF), where the third response message carries an EAP message, the S-NSSAI, the GPSI (or the SUPI), and the PLMN-ID (or the AMF-ID). Accordingly, the NSSAAF (or the AUSF) receives the third response message.

509: The NSSAAF (or the AUSF) sends the third response message to the AMF, where the third response message carries the EAP message, the S-NSSAI, and the GPSI (or the SUPI). Accordingly, the AMF receives the third response message.

510: The AMF sends a NAS message to the UE, where the NAS message carries the EAP message and the S-NSSAI. Accordingly, the UE receives the NAS message.

511: The UE sends the NAS message to the AMF, where the NAS message carries the EAP message and the S-NSSAI. Accordingly, the AMF receives the NAS message.

512: The AMF sends a fourth request message to the NSSAAF (or the AUSF), where the fourth request message carries the EAP message, the S-NSSAI, the GPSI (or the SUPI), and the PLMN-ID (or the AMF-ID). Accordingly, the NSSAAF (or the AUSF) receives the fourth request message.

Optionally, the fourth request message may alternatively not carry the PLMN-ID (or the AMF-ID). In this case, the method shown in FIG. 5A, FIG. 5B, and FIG. 5C may further include step 513.

513: The NSSAAF (or the AUSF) determines the PLMN-ID (or the AMF-ID) based on the received fourth request message.

It may be understood that for specific descriptions of step 512 and step 513, refer to the descriptions of step 505 and step 506, and the descriptions of step 512 and step 513 are also applicable to the following embodiments.

514: The NSSAAF (or the AUSF) sends the fourth request message to the AAA-S, where the fourth request message carries the EAP message, the S-NSSAI, the GPSI (or the SUPI), and the PLMN-ID (or the AMF-ID). Accordingly, the NSSAAF (or the AUSF) receives the fourth request message.

It may be understood that step 508 to step 514 in FIG. 5A, FIG. 5B, and FIG. 5C may be further performed for a plurality of times. For this implementation, refer to the descriptions in FIG. 2A, FIG. 2B, and FIG. 2C. Details are not described herein again.

515: The AAA-S stores an EAP authentication result, an EAP-ID, the PLMN-ID (or the AMF-ID), the S-NSSAI, and the GPSI (or the SUPI).

In this embodiment of this application, the AAA-S stores a slice authentication result of the slice authentication that is initiated by the UE (the GPSI/SUPI and the EAP-ID) for the S-NSSAI via the PLMN (or the AMF). The AAA-S stores authentication status information of the S-NSSAI, so that when another PLMN (or AMF) subsequently initiates slice authentication for the S-NSSAI, the AAA-S may determine a specific PLMN (or AMF) via which the slice authentication is initiated for the S-NSSAI, or whether the slice authentication is initiated again after the PLMN (or the AMF) performs slice authentication, or the slice authentication is initiated for the first time by the another PLMN (or AMF). The AAA-S may learn, based on the authentication status information that is for the S-NSSAI and that is stored by the AAA-S, whether the slice authentication initiated by the PLMN (or the AMF) is the first slice authentication, the second slice authentication, or the like performed by the PLMN (or the AMF) for the S-NSSAI.

For example, the AMF (the AMF shown in FIG. 5A, FIG. 5B, and FIG. 5C) may be understood as AMF 1 in FIG. 3B, and the another AMF may be understood as AMF 2 in FIG. 3B. Alternatively, the AMF may be understood as AMF 2 in FIG. 3B, and the another AMF may be understood as AMF 1 in FIG. 3B. For example, the PLMN may be understood as PLMN 1 in FIG. 3B, and the another PLMN may be understood as PLMN 2 in FIG. 3B. For ease of description, an example in which the AMF is understood as AMF 1 in FIG. 3B and the another AMF is understood as AMF 2 in FIG. 3B is used below for description. The PLMN is understood as PLMN 1 in FIG. 3B, and the another PLMN may be understood as PLMN 2 in FIG. 3B. It may be understood that both PLMN 1 and PLMN 2 shown above belong to a VPLMN.

In other words, the AAA-S stores the authentication status information of the slice, so that the AAA-S may distinguish whether a slice authentication request (for example, the third request message or the fourth request message) received by the AAA-S is an authentication request initiated by PLMN 1 or authentication initiated by PLMN 2. In addition, that the AAA-S incorrectly refreshes a validity period of slice authentication of another PLMN is avoided, and a case in which a key becomes invalid because PLMNs are not distinguished from each other is avoided.

It may be understood that the authentication status information in this application may also be referred to as authentication-related information or the like. A name of the authentication status information is not limited in this application. The slice authentication status information may include a correspondence (which may also be referred to as an association relationship and the like) between a slice authentication result, an EAP-ID, a PLMN-ID (or an AMF-ID), S-NSSAI, and a GPSI (or an SUPI). In other words, the authentication status information may include the authentication status information of the terminal device for the slice authentication that is initiated by the first network for the slice, authentication status information of the slice in a second network, and/or the like.

516: The AAA-S sends a fourth response message to the NSSAAF (or the AUSF), where the fourth response message carries the EAP authentication result, the GPSI (or the SUPI), the S-NSSAI, and the PLMN-ID (or the AMF-ID). Accordingly, the NSSAAF (or the AUSF) receives the fourth response message.

517: The NSSAAF (or the AUSF) sends the fourth response message to the AMF, where the fourth response message carries the EAP authentication result, the GPSI (or the SUPI), and the S-NSSAI. Accordingly, the AMF receives the fourth response message.

518: The AMF sends a NAS message to the UE, where the NAS message carries the EAP authentication result. Accordingly, the UE receives the NAS message.

Optionally, the AMF may further send a registration update message (or a configuration update message) to the UE, where the registration update message carries the S-NSSAI and the like. It may be understood that a response message of the registration request message is not limited in this embodiment of this application. For the response message of the registration request message, refer to a related protocol, standard, or the like.

Optionally, in the method shown in FIG. 5A, FIG. 5B, and FIG. 5C, one of the messages (for example, the fourth request message in step 514) sent to the AAA-S may carry the PLMN-ID, the AMF-ID, or the like, and another message (for example, the third request message in step 507) may not carry the PLMN-ID or the AMF-ID. This is because all messages (regardless of an EAP message or an AAA protocol message) sent to the AAA-S carry a same session identifier (session ID). Therefore, the AAA-S may associate the third request message in step 507 with a session identifier carried in the fourth request message in step 514, to learn of the PLMN-ID or the AMF-ID in the third request message. Alternatively, the third request message carries the PLMN-ID or the AMF-ID, but the fourth request message does not carry the PLMN-ID or the AMF-ID.

Optionally, in the method shown in FIG. 5A, FIG. 5B, and FIG. 5C, a message (for example, the third response message in step 508 and the fourth response message in step 516) sent by the AAA-S to the NSSAAF (or the AUSF) may not carry the PLMN-ID (or the AMF-ID). In other words, a network function (such as an NSSAAF, an AUSF, or a UDM) in an HPLMN may not store authentication status information of a slice. When the network function (such as the NSSAAF, the AUSF, or the UDM) in the HPLMN needs to store the authentication status information of the slice, the message sent by the AAA-S to the NSSAAF (or the AUSF) may carry the PLMN-ID (or the AMF-ID).

It may be understood that for the third request message, the fourth request message, and/or the like that are not described in detail, refer to the descriptions of the first request message and/or the second request message in FIG. 2A, FIG. 2B, and FIG. 2C. Details are not described herein again.

In this embodiment of this application, the third request message and/or the fourth request message carry the identification information of the network, so that for one thing, the AAA-S may distinguish between slice authentication initiated by different PLMNs for a same piece of S-NSSAI; and for another, the AAA-S is prevented from confusing the slice authentication initiated by the different PLMNs for the same piece of S-NSSAI. In addition, the slice authentication initiated by the different PLMNs for the same piece of S-NSSAI is distinguished from each other, so that the AAA-S may distinguish between keys used by the different PLMNs (or AMFs), to avoid a case in which a part of AMFs cannot use the keys.

Figure 6A:
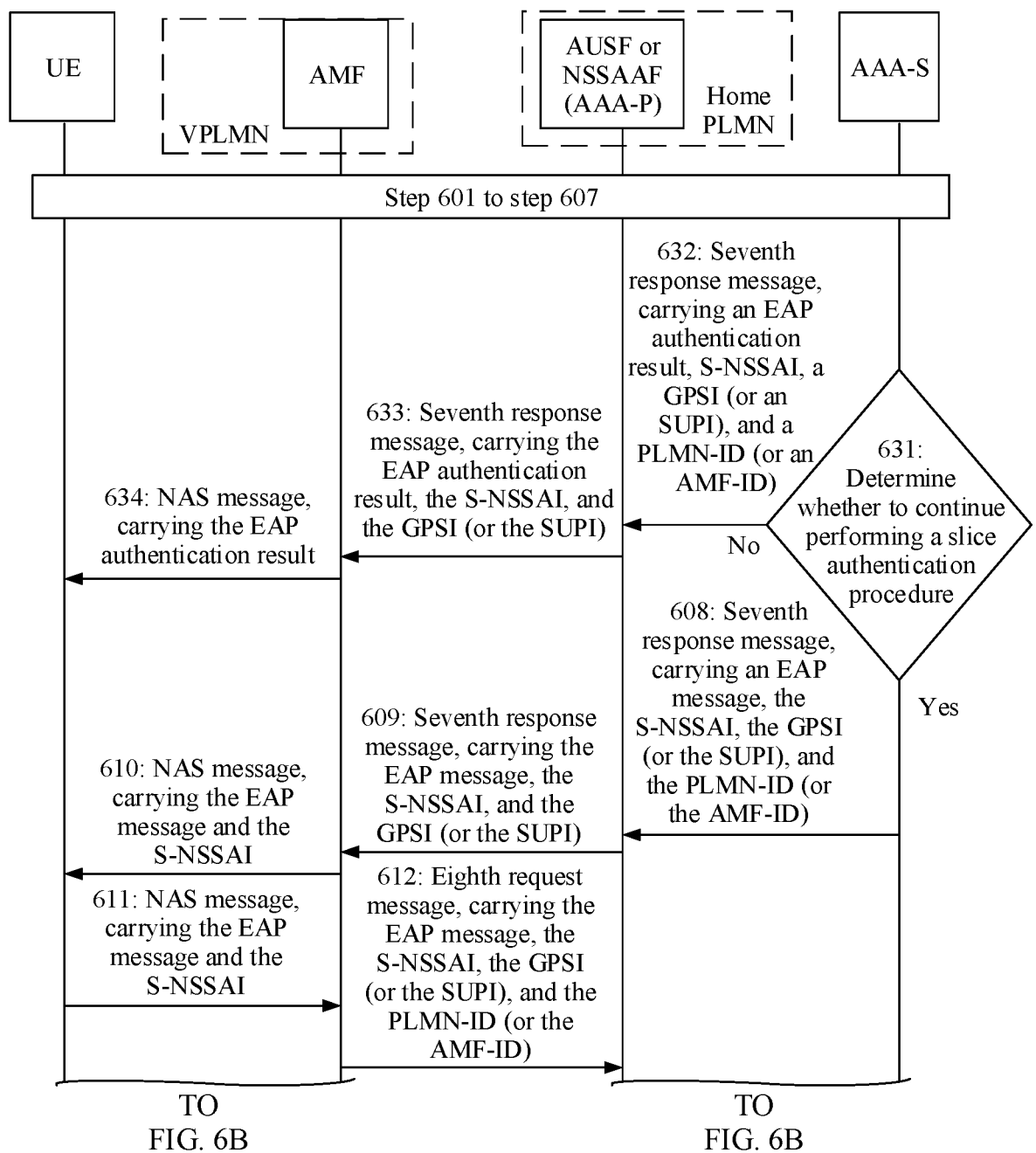
FIG. 6A and FIG. 6B are a schematic flowchart of a slice authentication method according to an embodiment of this application.
Figure 6B:
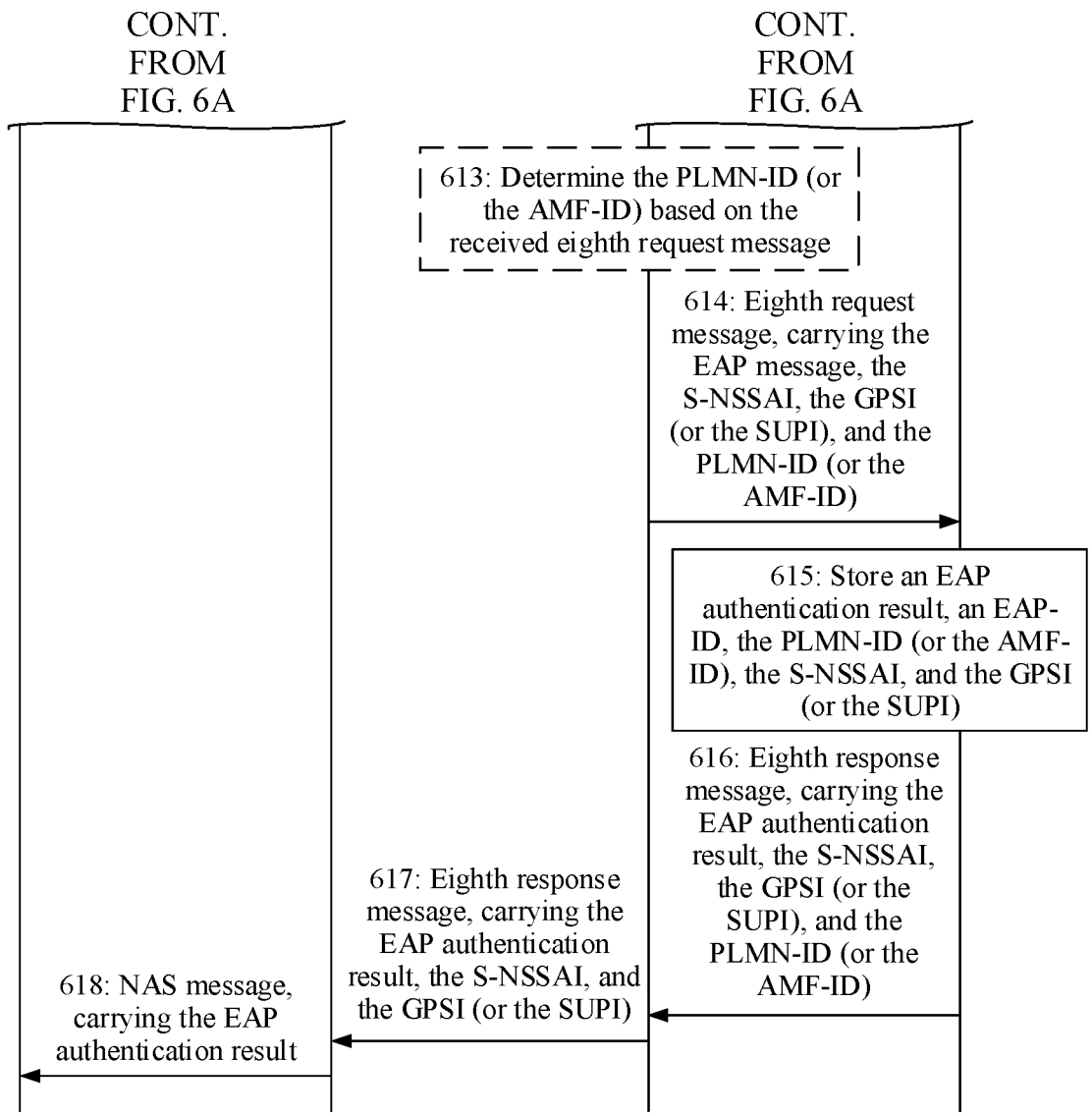

Further, the AAA-S stores authentication status information of slice authentication performed by different networks for the same piece of S-NSSAI, so that the AAA-S may provide beneficial information for subsequent slice authentication. For specific steps of this manner, refer to a method shown in FIG. 6A and FIG. 6B. FIG. 6A and FIG. 6B are a schematic flowchart of a slice authentication method according to an embodiment of this application. It may be understood that, in some implementations, the methods shown in FIG. 5A, FIG. 5B, and FIG. 5C and FIG. 6A and FIG. 6B may be combined. In other implementations, FIG. 5A, FIG. 5B, and FIG. 5C and FIG. 6A and FIG. 6B may alternatively be separately performed, or the like. This is not limited in this application. As shown in FIG. 6A and FIG. 6B, the slice authentication method includes the following steps.

601: UE sends a registration request message to an AMF, where the registration request message carries identification information of a slice and identification information of the UE. Accordingly, the AMF receives the registration request message.

602: The AMF determines, based on the identification information of the slice and subscription information of the UE for the slice, to perform slice authentication for the slice. In addition, if the AMF stores a slice authentication result indicating that the UE has successfully completed (for example, in another access manner) the slice authentication for the slice, the UE does not need to perform slice authentication for the slice again.

603: The AMF sends an EAP ID request for the slice authentication to the UE. Accordingly, the UE receives the EAP ID request for the slice authentication.

604: The UE sends an EAP ID response to the AMF, where the EAP ID response may still be carried in a NAS message, and the NAS message may further carry S-NSSAI.

605: The AMF sends a seventh request message to an NSSAAF (or an AUSF), where the seventh request message carries the EAP ID response, the identification information of the slice, the identification information of the UE, and identification information of a network. Accordingly, the NSSAAF receives the seventh request message.

Optionally, the seventh request message may alternatively not carry the identification information of the network. In this case, the method shown in FIG. 6A and FIG. 6B may further include step 606.

606: The NSSAAF (or the AUSF) determines the identification information (for example, a PLMN-ID or an AMF-ID) of the network based on the received seventh request message. For a method of determining, by the NSSAAF (or the AUSF), the identification information of the network, refer to the descriptions in step 506. Details are not described herein again.

607: The NSSAAF (or the AUSF) sends the seventh request message to an AAA-S, where the seventh request message carries the EAP ID response, the S-NSSAI, a GPSI (or an SUPI), and the PLMN-ID (or the AMF-ID). Accordingly, the AAA-S receives the seventh request message.

631: The AAA-S determines whether to continue performing slice authentication, where if the AAA-S determines to continue performing slice authentication, the method shown in FIG. 6A and FIG. 6B may further include step 608 to step 618; or if the AAA-S determines not to continue performing slice authentication, the method shown in FIG. 6A and FIG. 6B may further include step 632 to step 634.

In some implementations, the VPLMN (or the AMF) shown in FIG. 5A, FIG. 5B, and FIG. 5C and a VPLMN (or the AMF) shown in FIG. 6A and FIG. 6B are not a same VPLMN (or AMF). For example, the VPLMN (or the AMF) shown in FIG. 5A, FIG. 5B, and FIG. 5C is PLMN 1 (or AMF 1) in FIG. 3B, and the VPLMN (or the AMF) shown in FIG. 6A and FIG. 6B is PLMN 2 (or AMF 2) in FIG. 3B. The AAA-S stores, according to step 515 shown in FIG. 5A, FIG. 5B, and FIG. 5C, authentication status information of the UE for slice authentication that is initiated via AMF 1 (or PLMN 1) for the S-NSSAI (that is, the AAA-S stores the authentication status information of the S-NSSAI). In this case, when AMF 2 initiates slice authentication for the S-NSSAI, the AAA-S may learn, by receiving the seventh request message, that the UE requests (or initiates) slice authentication for the S-NSSAI via PLMN 2 or AMF 2. Therefore, the AAA-S may determine, based on an EAP authentication result (for example, authentication succeeds), the PLMN-ID (or the AMF-ID), the S-NSSAI, the GPSI (or the SUPI), and a policy (which is also referred to as a local policy) of AMF 2 that are stored in the AAA-S, whether AMF 2 needs to continue performing slice authentication for the S-NSSAI. In an implementation, if the AAA-S allows different PLMNs to share a slice authentication result, the AAA-S may determine not to continue an authentication procedure (that is, not to perform slice authentication), and step 632 to step 634 are performed. In another implementation, if the AAA-S does not allow PLMN 2 to share a slice authentication result with another PLMN, the AAA-S may determine that a slice authentication procedure initiated by PLMN 2 needs to be continued (that is, the slice authentication is to be performed), and step 608 to step 618 are performed.

The foregoing two implementations are shown with reference to the methods shown in FIG. 5A, FIG. 5B, and FIG. 5C and FIG. 6A and FIG. 6B. In other words, the AAA-S may determine, based on a stored slice (S-NSSAI) authentication result of same UE (a same GPSI and EAP ID) and an AAA-S policy, whether slice authentication further needs to be continued. For example, if the UE has successfully completed authentication via another PLMN, the AAA-S may skip re-authentication, directly acknowledge an authentication request initiated by the PLMN, and perform recording. However, when the methods shown in FIG. 5A, FIG. 5B, and FIG. 5C and FIG. 6A and FIG. 6B are separately performed, that is, when the AAA-S does not store a slice authentication result of the UE for slice authentication that is initiated via the AMF for the S-NSSAI, the AAA-S may also determine that the AMF may continue performing slice authentication.

632: The AAA-S sends a seventh response message to the NSSAAF (or the AUSF), where the seventh response message carries an EAP authentication result, the S-NSSAI, and the GPSI (or the SUPI). Accordingly, the NSSAAF (or the AUSF) receives the seventh response message.

633: The NSSAAF (or the AUSF) sends the seventh response message to the AMF, where the seventh response message carries the EAP authentication result, the S-NSSAI, and the GPSI (or the SUPI). Accordingly, the AMF receives the seventh response message.

634: The AMF sends a NAS message to the UE, where the NAS message carries the EAP authentication result. Accordingly, the UE receives the NAS message.

It may be understood that for specific descriptions of step 632 to step 634, refer to step 616 to step 618. Details are not described herein.

608: The AAA-S sends a seventh response message to the NSSAAF (or the AUSF), where the seventh response message carries an EAP message, the S-NSSAI, the GPSI (or the SUPI), and the PLMN-ID (or the AMF-ID). Accordingly, the NSSAAF (or the AUSF) receives the seventh response message.

609: The NSSAAF (or the AUSF) sends the seventh response message to the AMF, where the seventh response message carries the EAP message, the S-NSSAI, and the GPSI (or the SUPI). Accordingly, the AMF receives the seventh response message.

610: The AMF sends a NAS message to the UE, where the NAS message carries the EAP message and the S-NSSAI. Accordingly, the UE receives the NAS message.

611: The UE sends the NAS message to the AMF, where the NAS message carries the EAP message and the S-NSSAI. Accordingly, the AMF receives the NAS message.

612: The AMF sends an eighth request message to the NSSAAF (or the AUSF), where the eighth request message carries the EAP message, the S-NSSAI, the GPSI (or the SUPI), and the PLMN-ID (or the AMF-ID). Accordingly, the NSSAAF (or the AUSF) receives the eighth request message.

Optionally, the eighth request message may alternatively not carry the identification information of the network PLMN-ID (or the AMF-ID). In this case, the method shown in FIG. 6A and FIG. 6B may further include step 613.

613: The NSSAAF (or the AUSF) determines the PLMN-ID (or the AMF-ID) based on the received eighth request message.

614: The NSSAAF (or the AUSF) sends the eighth request message to the AAA-S, where the eighth request message carries the EAP message, the S-NSSAI, the GPSI (or the SUPI), and the PLMN-ID (or the AMF-ID). Accordingly, the NSSAAF (or the AUSF) receives the eighth request message.

615: The AAA-S stores an EAP authentication result, an EAP-ID, the PLMN-ID (or the AMF-ID), the S-NSSAI, and the GPSI (or the SUPI).

616: The AAA-S sends an eighth response message to the NSSAAF (or the AUSF), where the eighth response message carries the EAP authentication result, the GPSI (or the SUPI), the S-NSSAI, and the PLMN-ID (or the AMF-ID). Accordingly, the NSSAAF (or the AUSF) receives the eighth response message.

617: The NSSAAF (or the AUSF) sends the eighth response message to the AMF, where the eighth response message carries the EAP authentication result, the GPSI (or the SUPI), and the S-NSSAI. Accordingly, the AMF receives the eighth response message.

618: The AMF sends a NAS message to the UE, where the NAS message carries the EAP authentication result. Accordingly, the UE receives the NAS message.

It may be understood that for step 601 to step 618 in this embodiment of this application, refer to the method shown in FIG. 5A, FIG. 5B, and FIG. 5C. Details are not described herein again. For example, for the seventh request message, refer to the third request message. For the seventh response message, refer to the third response message. For the eighth request message, refer to the fourth request message. For the eighth response message, refer to the fourth response message.

In FIG. 5A, FIG. 5B, and FIG. 5C and FIG. 6A and FIG. 6B, the AAA-S stores the EAP authentication result, the EAP-ID, the PLMN-ID (or the AMF-ID), the S-NSSAI, and the GPSI (or the SUPI).

In some implementations, in the method shown in FIG. 5A, FIG. 5B, and FIG. 5C, any one or more of the third request message, the third response message, the fourth request message, or the fourth response message may alternatively not carry the identification information (for example, the PLMN-ID or the AMF-ID) of the network. In this case, the NSSAAF (or the AUSF) may obtain the identification information of the network in step 506 and/or step 513. In addition, in step 506 and/or step 513, the NSSAAF (or the AUSF) may obtain a session (session) ID from the EAP message or the AAA protocol message in the third request message or the fourth request message, and store identity information, such as the GPSI, of the UE, the S-NSSAI, and the identification information of the network (for example, the AMF-ID) that correspond to the session ID.

Further, in step 516, the NSSAAF (or the AUSF) searches received messages for a message with the same session ID. An EAP authentication result included in the message is the slice authentication result of the UE (the GPSI/EAP-ID) for the slice authentication that is initiated by the PLMN/AMF for the S-NSSAI. In other words, the NSSAAF (or the AUSF) associates the authentication result in the fourth response message in step 516 with the session ID, so that the NSSAAF (or the AUSF) may store the EAP authentication result, the PLMN-ID (or the AMF-ID), the S-NSSAI, and the GPSI (or the SUPI).

Optionally, before performing step 502, the AMF may send a sixth request message to the NSSAAF (or the AUSF). The sixth request message may be for requesting the slice authentication result of the UE for the S-NSSAI, and the like. For the sixth request message, refer to a fifth request message shown in FIG. 8A and FIG. 8B. Details are not described herein. In addition, the NSSAAF (or the AUSF) may further send a sixth response message to the AMF. For the sixth response message, refer to a fifth response message shown in FIG. 8A and FIG. 8B. Details are not described herein either.

Figure 7A:
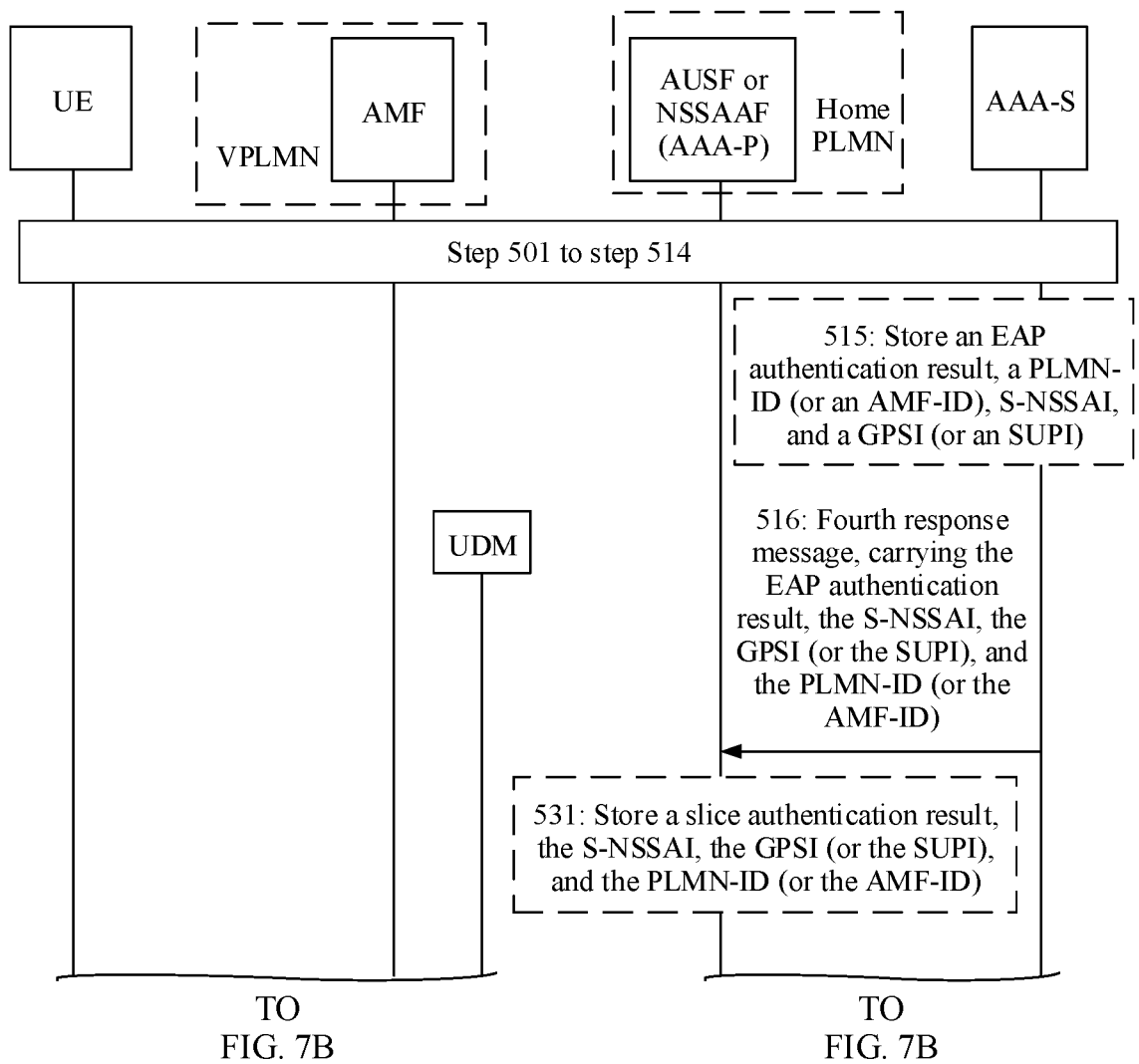
FIG. 7A and FIG. 7B are a schematic flowchart of a slice authentication method according to an embodiment of this application.
Figure 7B:
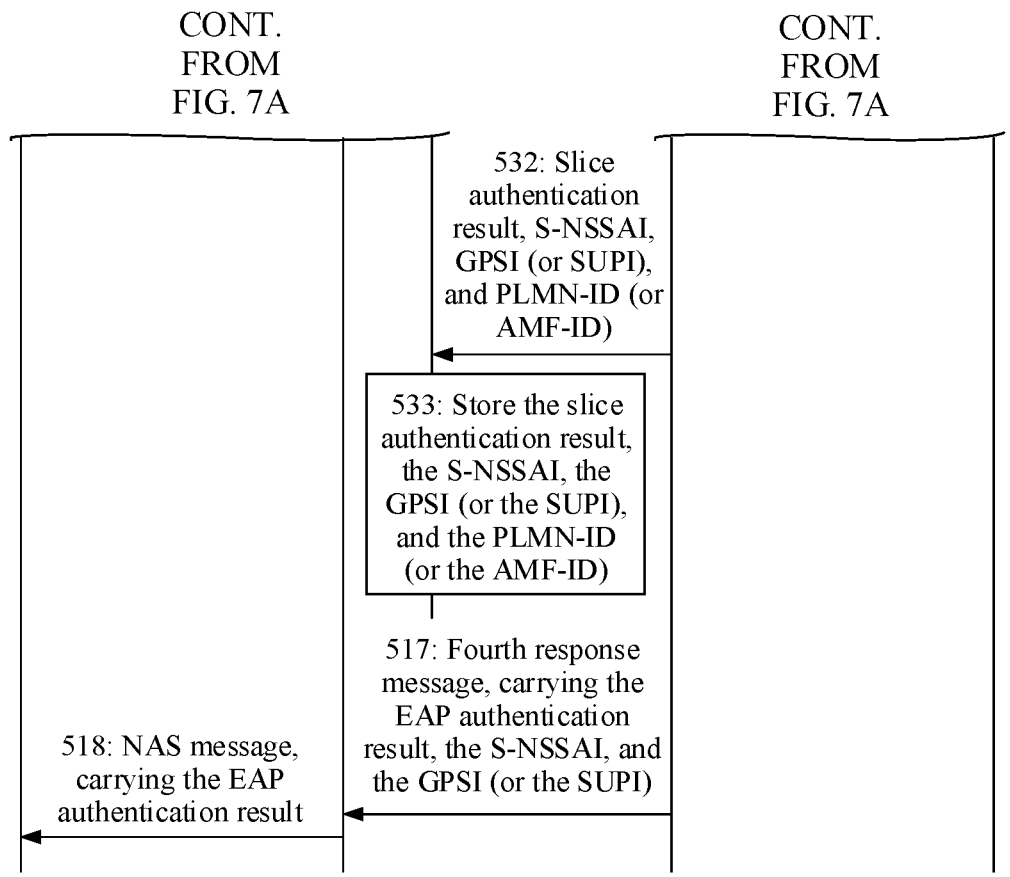

Further, the NSSAAF (or the AUSF) may further send the EAP authentication result, the PLMN-ID (or the AMF-ID), the S-NSSAI, and the GPSI (or the SUPI) to a UDM, as shown in step 531 to step 533 in FIG. 7A and FIG. 7B.

In some other implementations, this application further provides a slice authentication method. In the method, an EAP authentication result, a PLMN-ID (or an AMF-ID), S-NSSAI, and a GPSI (or an SUPI) may be stored in a UDM. The method shown in FIG. 5A, FIG. 5B, and FIG. 5C is used as an example. A slice authentication method provided in this embodiment of this application is shown in FIG. 7A and FIG. 7B. For specific descriptions of step 501 to step 518 in FIG. 7A and FIG. 7B, refer to FIG. 5A, FIG. 5B, and FIG. 5C. Details are not described herein again.

It may be understood that an AAA-S in FIG. 7A and FIG. 7B may store an EAP authentication result, a PLMN-ID (or an AMF-ID), S-NSSAI, and a GPSI (or an SUPI); or an AAA-S may not store an EAP authentication result, a PLMN-ID (or an AMF-ID), S-NSSAI, and a GPSI (or an SUPI). This is not limited in this embodiment of this application.

As shown in FIG. 7A and FIG. 7B, after step 516, the method shown in FIG. 7A and FIG. 7B further includes the following steps.

531: An NSSAAF (or an AUSF) stores a slice authentication result, the S-NSSAI, the GPSI (or the SUPI), and the PLMN-ID (or the AMF-ID).

In other words, the NSSAAF (or the AUSF) may store the authentication result of UE (the GPSI or the SUPI) for slice authentication that is initiated by an AMF (the AMF-ID) for a slice (the S-NSSAI). Alternatively, the NSSAAF (or the AUSF) may store an association relationship between identification information (for example, the GPSI or the SUPI) of the UE, identification information (for example, the AMF-ID) of a network, and the authentication result (for example, the EAP authentication result) of the slice (for example, the S-NSSAI). The descriptions of storing the association relationship are also applicable to another embodiment of this application.

It may be understood that the NSSAAF (or the AUSF) may store the foregoing information, or may not store the foregoing information. This is not limited in this embodiment of this application.

532: The NSSAAF (or the AUSF) sends the slice authentication result, the S-NSSAI, the GPSI (or the SUPI), and the PLMN-ID (or the AMF-ID) to a UDM.

533: The UDM stores the slice authentication result, the S-NSSAI, the GPSI (or the SUPI), and the PLMN-ID (or the AMF-ID).

It may be understood that a sequence of step 517 and step 531 is not limited in this embodiment of this application.

In this embodiment of this application, the UDM may assist the AAA-S in initiating re-authentication, revocation, or the like by storing the foregoing information. When the AAA-S initiates a re-authentication or revocation request, the NSSAAF (or the AUSF) or the UDM may be indexed to all related AMFs, and forward an EAP request message of corresponding re-authentication or revocation to the AMFs.

Re-authentication and revocation procedures are described by using examples, but this should not be construed as a limitation to this embodiment of this application.

For example, the re-authentication procedure initiated by the AAA-S is as follows.

(1) The AAA-S sends a re-authentication request message to the NSSAAF or the AUSF, where the re-authentication request message carries S-NSSAI and a GPSI (or an SUPI). Optionally, the re-authentication request message may further carry a PLMN-ID (or an AMF-ID), to indicate re-authentication of authentication initiated by a specific PLMN for an original slice.

(2) The NSSAAF determines a corresponding AMF (for example, the AMF shown in FIG. 7A and FIG. 7B), where the AMF is configured to process the re-authentication with the UE for the S-NSSAI. For example, the NSSAAF may send a request message to the UDM, to request the UDM to determine a required AMF. The request message carries the GPSI (or the SUPI) of the UE. Optionally, the re-authentication request message may further carry a PLMN-ID stored by the NSSAAF or received from the AAA-S. The UDM determines a corresponding PLMN and AMF based on a received PLMN-ID and a stored AMF-ID corresponding to slice authentication performed by the UE for the S-NSSAI. Optionally, if a determined AMF-ID cannot serve the UE, the UDM may perform replacement by using another AMF, for example, another AMF in a same AMF set (AMF set) in a same PLMN or a default AMF in a PLMN, to process the re-authentication with the UE.

(3) The NSSAAF sends the re-authentication request message to the determined AMF, where the re-authentication request message carries the GPSI (or the SUPI) of the UE and the S-NSSAI.

(4) After receiving the re-authentication request message, the AMF initiates re-authentication between the UE and the AAA-S.

For example, the revocation procedure initiated by the AAA-S is as follows.

(1) The AAA-S sends a revocation request message for UE to the NSSAAF or the AUSF, where the revocation request message carries S-NSSAI and a GPSI (or an SUPI). Optionally, the revocation request message may further carry a PLMN-ID.

(2) The NSSAAF determines a corresponding AMF (for example, the AMF shown in FIG. 7A and FIG. 7B), where the AMF is configured to process the revocation with the UE for the S-NSSAI. For example, the NSSAAF may send a request message to the UDM, to request the UDM to determine a required AMF. The request message carries the GPSI (or the SUPI) of the UE. Optionally, if only a slice authentication result of slice authentication initiated by a specific PLMN is revoked, the request message may further carry a PLMN-ID stored by the NSSAAF or received from the AAA-S. The UDM determines a corresponding AMF based on an AMF-ID corresponding to slice authentication initiated by the UE via the PLMN for the S-NSSAI. Optionally, if a determined AMF-ID cannot serve the UE, the UDM may perform replacement by using another AMF in a same AMF set (AMF set), a default AMF in a same PLMN, or the like, to process the revocation procedure of the UE.

(3) The NSSAAF sends the revocation request message to the determined AMF, where the revocation request message carries the GPSI of the UE and the S-NSSAI.

(4) After receiving the revocation request message, the AMF initiates the revocation procedure with the UE for the S-NSSAI.

It may be understood that the foregoing is merely an example, and should not be understood as a limitation to this embodiment of this application.

It should be further noted that in step 532, the NSSAAF (or the AUSF) obtains information such as the slice authentication result and forwards the information to the UDM. If there is no interface between the NSSAAF (or the AUSF) and the UDM, the information such as the slice authentication result may be sent to the UDM via the AMF. For example, after the AMF receives the fourth response message in step 517, the AMF may directly send the information such as the slice authentication result to the UDM through an interface between the AMF and the UDM. It may be understood that the descriptions of there being no interface between the UDM and the NSSAAF (or the AUSF) are also applicable to another embodiment of this application.

Figure 8A:
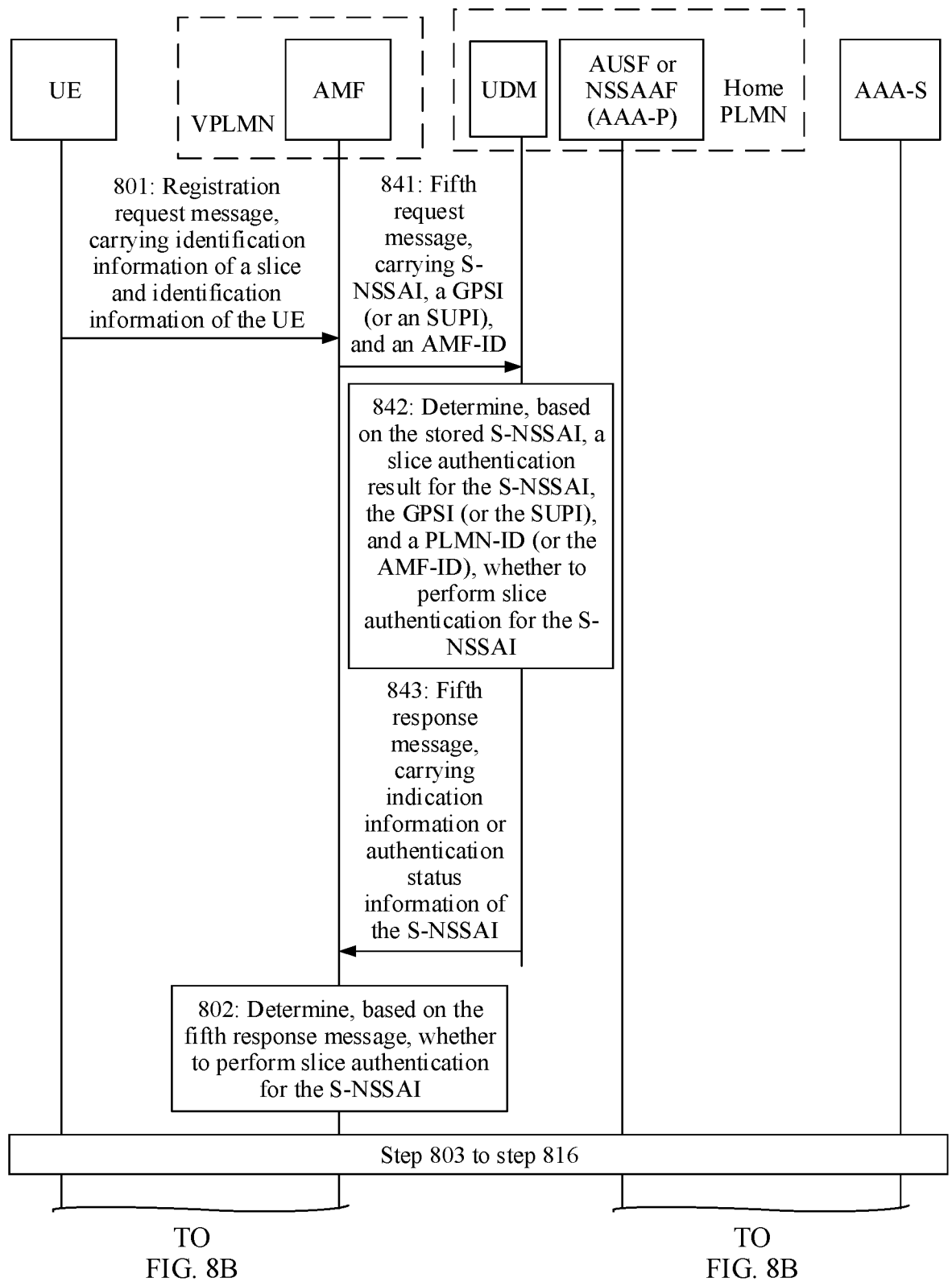
FIG. 8A and FIG. 8B are a schematic flowchart of a slice authentication method according to an embodiment of this application.
Figure 8B:
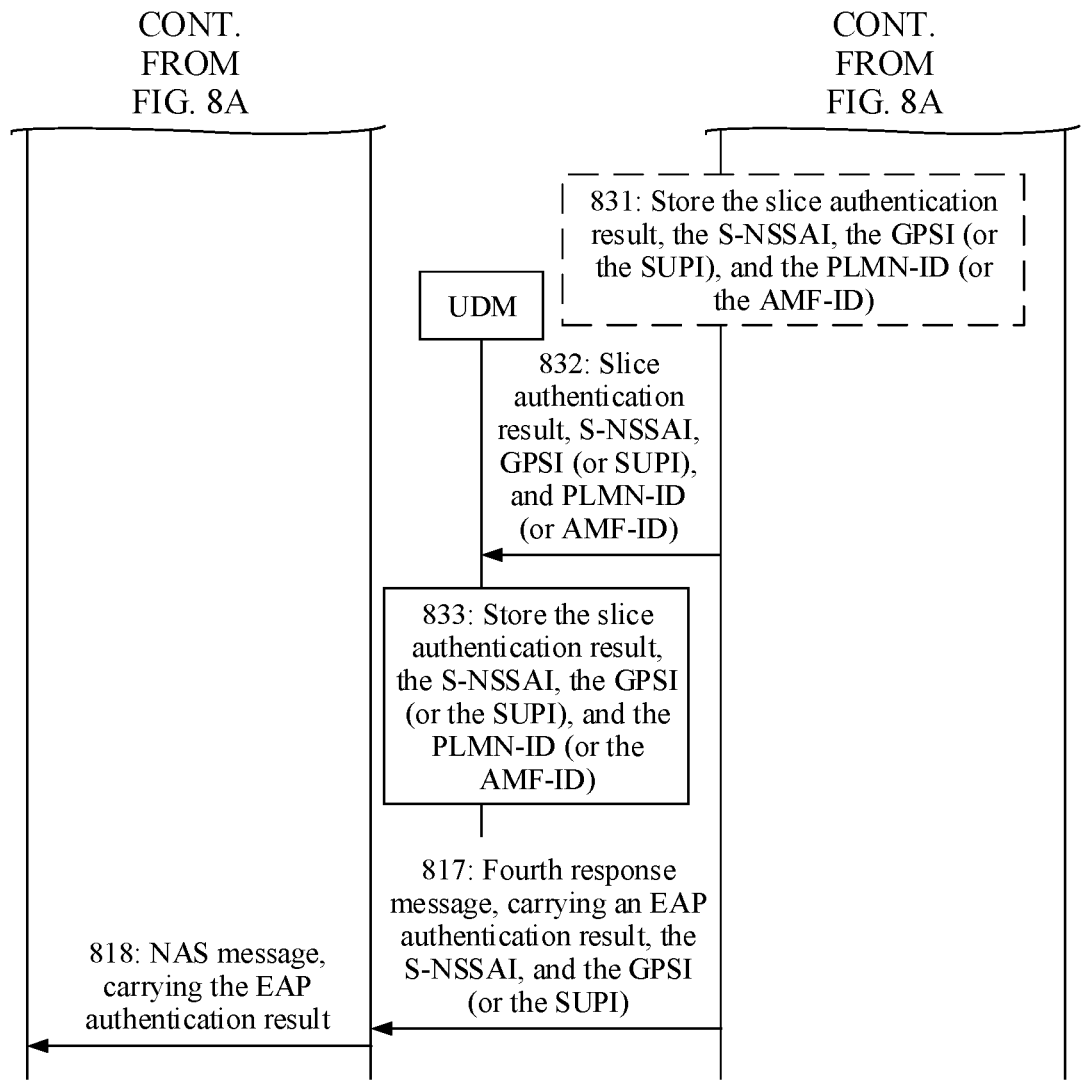

By storing the EAP authentication result, the S-NSSAI, the GPSI (or the SUPI), and the PLMN-ID (or the AMF-ID), the UDM may provide beneficial information for another AMF which subsequently initiates slice authentication. Refer to FIG. 8A and FIG. 8B.

801: UE sends a registration request message to an AMF, where the registration request message carries identification information of a slice and identification information of the UE. Accordingly, the AMF receives the registration request message.

According to the method shown in FIG. 7A and FIG. 7B, a UDM may store authentication status information of the slice. Therefore, the method shown in FIG. 8A and FIG. 8B further includes step 841 to step 843.

841: The AMF sends a fifth request message to the UDM, where the fifth request message carries S-NSSAI, a GPSI (or an SUPI), and a PLMN-ID (or an AMF-ID). Accordingly, the UDM receives the fifth request message.

The fifth request message may be for requesting to obtain a slice authentication result of the UE for slice authentication that is initiated by another PLMN (or AMF) for the 5-NSSAI.

Optionally, the fifth request message may not carry the AMF-ID, and the UDM determines or obtains the AMF-ID of the AMF based on a token in the fifth request message.

Usually, when the AMF sends a slice-related request message to the UDM, the AMF is limited to obtaining slice-related subscription information of the UE. In other words, the UDM does not store a specific AMF via which the UE initiates slice authentication for the S-NSSAI. However, in this embodiment of this application, the UDM may store the authentication status information of the UE for the slice. Therefore, the AMF may request to obtain the authentication status information of the UE for the slice from the UDM. In addition, the UDM may store the slice authentication result, the S-NSSAI, the GPSI (or the SUPI), the PLMN-ID (or the AMF-ID), and the like of the UE, and the foregoing information may be updated each time after slice authentication is completed.

It may be understood that the AMF may alternatively request, in the fifth request message, slice authentication results for a plurality of pieces of S-NSSAI, or the like. This is not limited in this embodiment of this application.

842: The UDM determines, based on stored information of the UE, including, for example, the GPSI (or the SUPI) of the UE, the S-NSSAI of the slice to which the UE subscribes, the slice authentication result of the UE for the S-NSSAI, and the PLMN-ID (or the AMF-ID) of an initiating network corresponding to the slice authentication result, whether to perform slice authentication for the S-NSSAI. That is, the UDM shown in FIG. 8A and FIG. 8B may determine, based on the S-NSSAI, the slice authentication result for the S-NSSAI, the GPSI (or the SUPI), and the PLMN-ID (or the AMF-ID) that are stored in the UDM, whether to perform slice authentication for the S-NSSAI.

In other words, the UDM may determine, based on a slice authentication result of the UE (for slice authentication that is initiated by another PLMN or another AMF) for the S-NSSAI, that the UE needs to initiate slice authentication via a current AMF (namely, the AMF-ID in the fifth request message). Alternatively, the UDM may determine, based on the stored slice authentication result of the UE for the S-NSSAI, that the UE does not need to initiate slice authentication via a current AMF (namely, the AMF-ID in the fifth request message).

Optionally, in the method shown in step 842, only an authentication status of the UE for the S-NSSAI of the slice may be queried and obtained, and whether the current AMF (namely, the AMF-ID in the fifth request message) needs to perform slice authentication for the S-NSSAI does not need to be determined. Whether the slice authentication needs to be performed is determined by the current AMF after a response is received (in step 843). For a specific determining method, refer to the determining method of the UDM in step 842 in this embodiment.

In some implementations, the AMF shown in FIG. 7A and FIG. 7B and the AMF shown in FIG. 8A and FIG. 8B are not a same AMF. For example, the AMF shown in FIG. 7A and FIG. 7B is AMF 1 in FIG. 3B, and the AMF shown in FIG. 8A and FIG. 8B is AMF 2 in FIG. 3B. To be specific, the UDM has stored authentication status information of the UE for slice authentication that is initiated by AMF 1 for the S-NSSAI. In this case, because AMF 2 initiates slice authentication in step 841, the UDM may determine, based on a policy (or a local policy or the like) of the UDM, to perform slice authentication for the S-NSSAI. Alternatively, because slice authentication initiated by AMF 2 for the S-NSSAI has been performed by AMF 1, the UDM may further determine that the slice authentication does not need to be performed for the S-NSSAI (this is equivalent to directly allowing or rejecting a slice access request of the UE).

For example, the UE has completed performing slice authentication for the S-NSSAI via AMF 1, and stores, in the UDM, a slice authentication result (for example, for the slice authentication completed via AMF 1 or PLMN 1) for the S-NSSAI. When AMF 2 requests the slice authentication result for the S-NSSAI, the UDM may determine, based on that the UE has successfully completed performing slice authentication for the S-NSSAI via AMF 1/PLMN 1, that the UE does not need to be authenticated again.

For another example, the UE has completed performing slice authentication for the S-NSSAI via AMF 1, and the UDM stores a slice authentication result for the S-NSSAI indicating failed authentication (that is, access is rejected). When AMF 2 requests the slice authentication status of the S-NSSAI, the UDM may determine, based on the slice authentication result for the S-NSSAI, that the UE does not need to initiate authentication again (and even if the UE initiates authentication again, the authentication still fails or is rejected). In another possible implementation, the UDM determines that the UE may further attempt to re-initiate slice authentication for the S-NSSAI.

For another example, the UE does not perform slice authentication for the S-NSSAI via any network. When AMF 2 requests the slice authentication status of the S-NSSAI, the UDM may determine that the UE needs to initiate authentication.

It should be noted that the methods shown in FIG. 7A and FIG. 7B and FIG. 8A and FIG. 8B may be combined, or the methods shown in FIG. 7A and FIG. 7B and FIG. 8A and FIG. 8B may be separately performed, or the like. This is not limited in this embodiment of this application.

843: The UDM sends a fifth response message to the AMF, and the AMF receives the fifth response message.

Optionally, in some implementations, the fifth response message may carry indication information, and the indication information may indicate whether to initiate slice authentication via the AMF (namely, the AMF-ID in the fifth request message, or AMF 2 shown above). For example, the indication information may indicate the AMF to perform slice authentication for the slice. Optionally, in some other implementations, the fifth response message may further carry a slice authentication result for the slice in another network. For example, the fifth response message may carry S-NSSAI, a GPSI (or an SUPI), a PLMN-ID (or an AMF-ID) (for example, AMF 1 or PLMN 1), and a slice authentication result for slice authentication initiated by the PLMN-ID (or the AMF-ID). For another example, the fifth response message may further carry information such as a reason why the slice authentication result for the S-NSSAI is a failure. Optionally, the UDM may send a most recently (or newly) stored slice authentication result of the UE for slice authentication that is initiated by the PLMN (or the AMF) for the S-NSSAI; or may send valid slice authentication results of the UE for slice authentication that is initiated by all PLMNs (or AMFs) for the S-NSSAI.

It should be noted that in step 842, the UDM may further determine, based on other information, whether to perform slice authentication for the S-NSSAI. For example, the UDM may determine, based on an agreement and a trust relationship between PLMNs, PLMN credibility, a stored PLMN blacklist/whitelist, information obtained from a network data analytics function of a network, and the like. For example, the UDM (belonging to an HPLMN) stores a trust relationship between PLMN 1 and PLMN 2 (where there is an agreement between PLMN 1 and PLMN 2, or a slice authentication result for slice authentication initiated by each of PLMN 1 and PLMN 2 may be shared with each other). When PLMN 2 requests a slice authentication result, the UDM stores a slice authentication result indicating that the UE completes performing slice authentication (successfully) via PLMN 1. Therefore, the UDM indicates, based on the trust relationship between PLMN 2 and PLMN 1, PLMN 2 not to initiate slice authentication again.

For another example, if there is no agreement between PLMN 1 and PLMN 2 in the foregoing example, and the UDM knows that security/credibility of PLMN 1 is higher (or lower), the UDM may notify PLMN 2 that slice authentication does not need to be (or needs to be) initiated.

For another example, if PLMN 1 and PLMN 2 in the foregoing example are in a whitelist in which a slice authentication result can be shared/a blacklist in which a slice authentication result cannot be shared, the UDM may notify, according to an indication of the blacklist/whitelist, PLMN 2 whether to initiate slice authentication. For example, if PLMN 1 and PLMN 2 are in the whitelist in which the slice authentication result can be shared, the UDM may indicate PLMN 2 to initiate slice authentication. For another example, if PLMN 1 and PLMN 2 are in the blacklist in which the slice authentication result cannot be shared, the UDM may indicate PLMN 2 not to initiate slice authentication.

Optionally, in another implementation, that the AMF obtains authentication status information of another PLMN may alternatively be performed after step 802. To be specific, the method shown in FIG. 8A and FIG. 8B may not include step 841 to step 843. However, after step 805, the method shown in FIG. 8A and FIG. 8B may further include: An NSSAAF (or an AUSF) determines, based on S-NSSAI stored by the NSSAAF (or the AUSF), a slice authentication result for the S-NSSAI, a GPSI (or an SUPI), and a PLMN-ID (or an AMF-ID), whether to perform slice authentication for the S-NSSAI. If the NSSAAF (or the AUSF) determines to perform slice authentication, step 807 is performed. If determining not to perform slice authentication, the NSSAAF (or the AUSF) sends, to the AMF, a message for indicating not to perform slice authentication.

It may be understood that for a method of determining, by the NSSAAF (or the AUSF), whether to perform slice authentication, refer to the foregoing method of the UDM. Details are not described herein again.

For a method of determining, by the UDM based on the stored S-NSSAI, the slice authentication result for the S-NSSAI, the GPSI (or the SUPI), and the PLMN-ID (or the AMF-ID), to perform slice authentication for the S-NSSAI, refer to the following descriptions.

802: The AMF determines, based on the fifth response message, whether to perform slice authentication for the S-NSSAI, where if the AMF determines that the slice authentication needs to be performed, step 803 continues to be performed.

If the AMF determines that the slice authentication does not need to be performed, the AMF may send a message to the UE, to notify the UE whether access to the slice is allowed. This is equivalent to directly jumping to a step after step 818. A method shown after step 818 is not limited in this embodiment of this application.

803: The AMF sends an EAP ID request for the slice authentication to the UE. Accordingly, the UE receives the EAP ID request for the slice authentication.

804: The UE sends an EAP ID response to the AMF, where the EAP ID response may still be carried in a NAS message, and the NAS message may further carry the S-NSSAI.

805: The AMF sends a ninth request message to the NSSAAF (or the AUSF), where the ninth request message carries the EAP ID response, the identification information of the slice, the identification information of the UE, and identification information of a network. Accordingly, the NSSAAF receives the ninth request message.

806: The NSSAAF (or the AUSF) determines the identification information (for example, the PLMN-ID or the AMF-ID) of the network based on the received ninth request message.

807: The NSSAAF (or the AUSF) sends the ninth request message to the AAA-S, where the ninth request message carries the EAP ID response, the S-NSSAI, the GPSI (or the SUPI), and the PLMN-ID (or the AMF-ID). Accordingly, the AAA-S receives the ninth request message.

808: The AAA-S sends a ninth response message to the NSSAAF (or the AUSF), where the ninth response message carries an EAP message, the S-NSSAI, the GPSI (or the SUPI), and the PLMN-ID (or the AMF-ID). Accordingly, the NSSAAF (or the AUSF) receives the ninth response message.

809: The NSSAAF (or the AUSF) sends the ninth response message to the AMF, where the ninth response message carries the EAP message, the S-NSSAI, and the GPSI (or the SUPI). Accordingly, the AMF receives the ninth response message.

810: The AMF sends a NAS message to the UE, where the NAS message carries the EAP message and the S-NSSAI. Accordingly, the UE receives the NAS message.

811: The UE sends the NAS message to the AMF, where the NAS message carries the EAP message and the S-NSSAI. Accordingly, the AMF receives the NAS message.

812: The AMF sends a tenth request message to the NSSAAF (or the AUSF), where the tenth request message carries the EAP message, the S-NSSAI, the GPSI (or the SUPI), and the PLMN-ID (or the AMF-ID). Accordingly, the NSSAAF (or the AUSF) receives the tenth request message.

813: The NSSAAF (or the AUSF) determines the PLMN-ID (or the AMF-ID) based on the received tenth request message.

814: The NSSAAF (or the AUSF) sends the tenth request message to the AAA-S, where the tenth request message carries the EAP message, the S-NSSAI, the GPSI (or the SUPI), and the PLMN-ID (or the AMF-ID). Accordingly, the NSSAAF (or the AUSF) receives the tenth request message.

815: The AAA-S stores an EAP authentication result, an EAP-ID, the PLMN-ID (or the AMF-ID), the S-NSSAI, and the GPSI (or the SUPI).

816: The AAA-S sends a tenth response message to the NSSAAF (or the AUSF), where the tenth response message carries the EAP authentication result, the GPSI (or the SUPI), the S-NSSAI, and the PLMN-ID (or the AMF-ID). Accordingly, the NSSAAF (or the AUSF) receives the tenth response message.

817: The NSSAAF (or the AUSF) sends the tenth response message to the AMF, where the tenth response message carries the EAP authentication result, the GPSI (or the SUPI), and the S-NSSAI. Accordingly, the AMF receives the tenth response message.

818: The AMF sends a NAS message to the UE, where the NAS message carries the EAP authentication result. Accordingly, the UE receives the NAS message.

Optionally, the method shown in FIG. 8A and FIG. 8B may further include step 831 to step 833. For specific descriptions of step 831 to step 833, refer to step 531 to step 533 in FIG. 7A and FIG. 7B. Details are not described herein again.

It should be noted that step 802 to step 816 shown in FIG. 8A and FIG. 8B are not shown in the accompanying drawings. For a specific procedure that is not shown, refer to FIG. 5A, FIG. 5B, and FIG. 5C.

According to the technical solutions provided in this application, security of slice authentication may be improved. An authentication server and/or an NSSAAF (or an AUSF, or the like) may distinguish between slice authentication statuses of slice authentication that is initiated by different PLMNs, to avoid incorrect update, termination, authentication validity extension, and the like of slice authentication with a same EAP-ID due to different PLMN-IDs. In addition, slice authentication efficiency may be improved, to be specific, unnecessary slice authentication is avoided while security is ensured, thereby saving network resources.

It may be understood that the foregoing described embodiments have their own emphasis. For an implementation that is not described in detail in one embodiment, refer to another embodiment. Details are not described herein again.

The following describes in detail a communication apparatus provided in this application.

Figure 9:
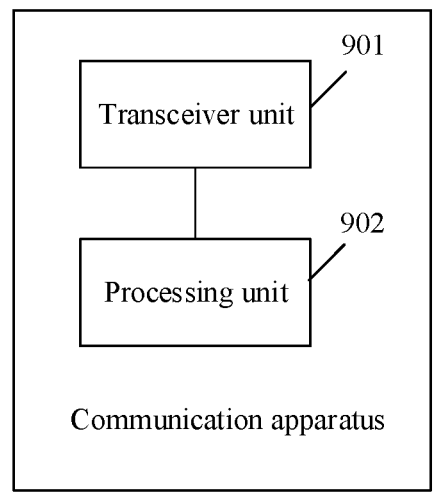
FIG. 9 is a schematic diagram of a structure of a communication apparatus according to an embodiment of this application.

FIG. 9 is a schematic diagram of a structure of a communication apparatus according to an embodiment of this application. The communication apparatus may be configured to perform an operation performed by the first NF according to the foregoing method embodiments. For example, the communication apparatus may be configured to perform an operation performed by the first NF according to the method shown in FIG. 4A and FIG. 4B. For example, the communication apparatus may be further configured to perform an operation performed by the AMF according to any one or more of the methods in FIG. 5A, FIG. 5B, and FIG. 5C to FIG. 8A and FIG. 8B.

As shown in FIG. 9, the communication apparatus includes a transceiver unit 901 and a processing unit 902.

The processing unit 902 is configured to initiate slice authentication between a terminal device and an authentication server for a slice.

The transceiver unit 901 is configured to: send identification information of a first network, identification information of the slice, and identification information of the terminal device to the authentication server, where the communication apparatus is an NF in the first network; or output identification information of a first network, identification information of the slice, and identification information of the terminal device.

The transceiver unit 901 is further configured to receive a slice authentication result for the slice, the identification information of the slice, and the identification information of the terminal device from the authentication server.

In a possible implementation, the transceiver unit 901 is specifically configured to: send the identification information of the first network, the identification information of the slice, and the identification information of the terminal device to the authentication server via a second NF; and receive the slice authentication result for the slice, the identification information of the slice, and the identification information of the terminal device that are sent by the authentication server via the second NF. Alternatively, the transceiver unit 901 is specifically configured to: output the identification information of the first network, the identification information of the slice, and the identification information of the terminal device; and obtain the slice authentication result for the slice, the identification information of the slice, and the identification information of the terminal device.

In a possible implementation, the transceiver unit 901 is further configured to: send a request message to the second NF or a third NF, where the request message is for requesting authentication status information of the terminal device for the slice, and the authentication status information of the terminal device for the slice includes authentication status information of the terminal device for the slice authentication that is initiated by the first network for the slice; and receive a response message from the second NF or the third NF. Alternatively, the transceiver unit 901 is further configured to output a request message and obtain a response message.

It may be understood that for the foregoing authentication status information of the terminal device for the slice, the request message, the response message, and the like, refer to the methods shown in FIG. 5A, FIG. 5B, and FIG. 5C to FIG. 8A and FIG. 8B. Details are not described herein again. For example, the response message may include: indication information, where the indication information indicates whether a fourth NF initiates slice authentication with the terminal device, or the indication information indicates whether the terminal device has completed performing slice authentication for the slice; the slice authentication result of the terminal device for the slice; and the authentication status information of the terminal device for the slice authentication that is initiated by the first network for the slice.

For example, the transceiver unit 901 may be further configured to receive the registration request message shown in FIG. 5A, FIG. 5B, and FIG. 5C to FIG. 8A and FIG. 8B. For another example, the transceiver unit 901 may be further configured to send the NAS message, the third request message, the fourth request message, the fifth request message, the seventh request message, the eighth request message, or the like shown in FIG. 5A, FIG. 5B, and FIG. 5C to FIG. 8A and FIG. 8B. For another example, the transceiver unit 901 may be further configured to receive the NAS message, the third response message, the fourth response message, the fifth response message, and the like shown in FIG. 5A, FIG. 5B, and FIG. 5C to FIG. 8A and FIG. 8B. For another example, the processing unit 902 may be further configured to perform step 502, step 802, or the like shown in FIG. 5A, FIG. 5B, and FIG. 5C to FIG. 8A and FIG. 8B. For specific implementations of the transceiver unit and the processing unit, refer to the first NF or the AMF shown in FIG. 4A and FIG. 4B to FIG. 8A and FIG. 8B. Details are not described herein again.

It should be understood that when the communication apparatus is the first NF or a component that implements the foregoing functions in the first NF (for example, a network function, a core device, or a network element), the processing unit 902 may be one or more processors, and the transceiver unit 901 may be a transceiver; or the transceiver unit 901 may be a sending unit and a receiving unit, the sending unit may be a transmitter, the receiving unit may be a receiver, and the sending unit and the receiving unit are integrated into one component, for example, a transceiver.

When the communication apparatus is a circuit system such as a chip, the processing unit 902 may be one or more processors, or the processing unit 902 may be a processing circuit or the like. The transceiver unit 901 may be an input/output interface, which is also referred to as a communication interface, an interface circuit, an interface, or the like. Alternatively, the transceiver unit 901 may be a sending unit and a receiving unit, the sending unit may be an output interface, the receiving unit may be an input interface, and the sending unit and the receiving unit are integrated into one unit, for example, an input/output interface. It may be understood that when the communication apparatus is any one of the second NF, the third NF, the fourth NF, or the authentication server, the descriptions of the processing unit and the transceiver unit are applicable to all communication apparatuses shown below.

The communication apparatus in this embodiment of this application may perform any function performed by the first NF in the foregoing method embodiments. For specific steps and/or functions that may be performed, refer to detailed descriptions in the foregoing method embodiments. Only brief descriptions are provided herein, and details are not described again.

Figure 10:
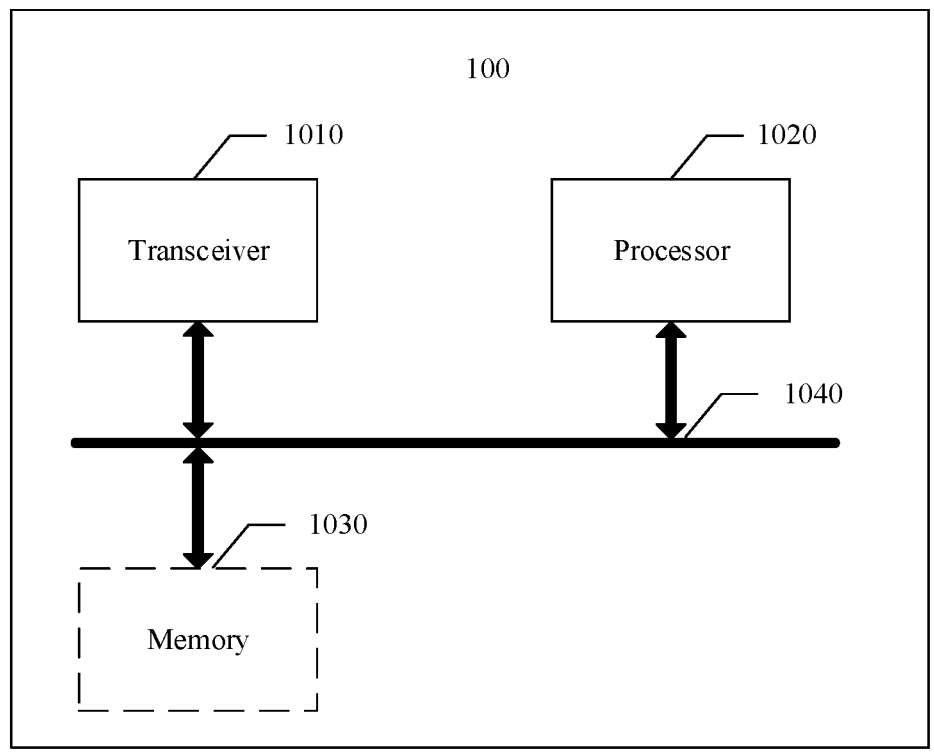
FIG. 10 is a schematic diagram of a structure of a communication apparatus according to an embodiment of this application.

In some implementations, the communication apparatus may be the first NF in the foregoing method embodiments, and the first NF may be a core device. In this case, the transceiver unit 901 may be implemented by using a transceiver, and the processing unit 902 may be implemented by using a processor. As shown in FIG. 10, a communication apparatus 100 includes one or more processors 1020 and a transceiver 1010. The processor and the transceiver may be configured to perform a function, an operation, or the like performed by the first NF.

The processor 1020 is configured to initiate slice authentication between a terminal device and an authentication server for a slice.

The transceiver 1010 is configured to: send identification information of a first network, identification information of the slice, and identification information of the terminal device to the authentication server, where the communication apparatus is an NF in the first network.

The transceiver 1010 is further configured to receive a slice authentication result for the slice, the identification information of the slice, and the identification information of the terminal device from the authentication server.

In a possible implementation, the transceiver 1010 is specifically configured to: send the identification information of the first network, the identification information of the slice, and the identification information of the terminal device to the authentication server via a second NF; and receive the slice authentication result for the slice, the identification information of the slice, and the identification information of the terminal device that are sent by the authentication server via the second NF.

In a possible implementation, the transceiver 1010 is further configured to: send a request message to the second NF or a third NF, where the request message is for requesting authentication status information of the terminal device for the slice, and the authentication status information of the terminal device for the slice includes authentication status information of the terminal device for the slice authentication that is initiated by the first network for the slice; and receive a response message from the second NF or the third NF.

For specific implementations of the processor and the transceiver, refer to the methods shown in FIG. 4A and FIG. 4B to FIG. 8A and FIG. 8B, or refer to steps and/or functions shown in FIG. 9.

In each implementation of the communication apparatus shown in FIG. 10, the transceiver may include a receiver and a transmitter. The receiver is configured to perform a receiving function (or operation), and the transmitter is configured to perform a transmitting function (or operation). The transceiver is configured to communicate with another device/apparatus through a transmission medium. The processor 1020 receives and sends data and/or signaling through the transceiver 1010, and is configured to implement a corresponding method and the like in FIG. 4A and FIG. 4B to FIG. 8A and FIG. 8B in the foregoing method embodiments.

Optionally, the communication apparatus 100 may further include one or more memories 1030, configured to store program instructions and/or data. The memory 1030 is coupled to the processor 1020. For example, the memory 1030 may be configured to store a root key, an access stratum key, or a non-access stratum key.

The coupling in embodiments of this application may be an indirect coupling or a communication connection between apparatuses, units, or modules in an electrical form, a mechanical form, or another form, and is used for information exchange between the apparatuses, the units, or the modules. The processor 1020 may cooperate with the memory 1030. The processor 1020 may execute the program instructions stored in the memory 1030. Optionally, at least one of the one or more memories may be included in the processor.

In this embodiment of this application, a specific connection medium between the transceiver 1010, the processor 1020, and the memory 1030 is not limited. In this embodiment of this application, the memory 1030, the processor 1020, and the transceiver 1010 are connected through a bus 1040 in FIG. 10. The bus is represented by using a thick line in FIG. 10. The foregoing is merely an example for description. A connection manner of other components is not limited thereto. The bus may be classified into an address bus, a data bus, a control bus, and the like. For ease of representation, only one thick line is for representing the bus in FIG. 10, but this does not mean that there is only one bus or only one type of bus.

In embodiments of this application, the processor may be a general-purpose processor, a digital signal processor, an application-specific integrated circuit, a field programmable gate array, another programmable logic device, a discrete gate or transistor logic device, a discrete hardware component, or the like, and may implement or perform the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module, or the like.

It may be understood that when the communication apparatus shown in FIG. 10 is the first NF, the first NF may further have more components than that shown in FIG. 10, and the like. This is not limited in this embodiment of this application.

It may be understood that the method performed by the processor and the transceiver above is merely an example. For specific steps performed by the processor and the transceiver, refer to the method described above.

It may be understood that the foregoing descriptions of a connection relationship between the processor, the transceiver, and the memory, the descriptions of the processor and the transceiver, and the like are all applicable to a core device shown below. For example, when the communication apparatus is any one of the second NF, the third NF, a fourth NF, or the authentication server, the descriptions of the connection relationship between the processor, the transceiver, and the memory, the descriptions of the processor or the transceiver, and the like are applicable to all communication apparatuses shown below.

Figure 11:
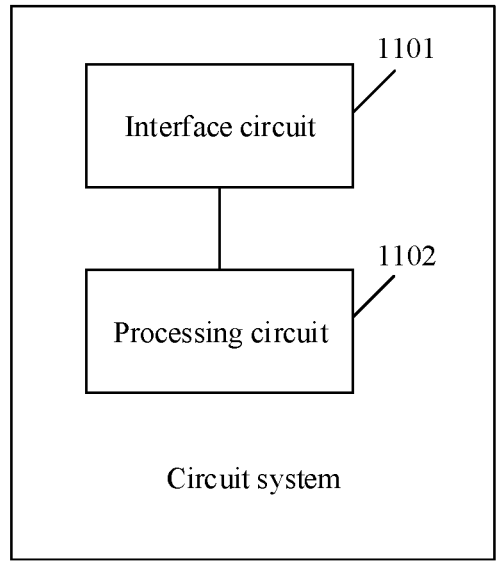
FIG. 11 is a schematic diagram of a structure of a communication apparatus according to an embodiment of this application.

In some other implementations, the communication apparatus may be a circuit system in the first NF. In this case, the processing unit 902 may be implemented by using a processing circuit, and the transceiver unit 901 is implemented by using an interface circuit. As shown in FIG. 11, a communication apparatus may include a processing circuit 1102 and an interface circuit 1101. The processing circuit 1102 may be a chip, a logic circuit, an integrated circuit, a processing circuit, a system on chip (system on chip, SoC) chip, or the like. The interface circuit 1101 may be a communication interface, an input/output interface, or the like.

The processing circuit 1102 is configured to initiate slice authentication between a terminal device and an authentication server for a slice.

The interface circuit 1101 is configured to output identification information of a first network, identification information of the slice, and identification information of the terminal device.

The interface circuit 1101 is further configured to obtain a slice authentication result for the slice, the identification information of the slice, and the identification information of the terminal device.

In a possible implementation, the interface circuit 1101 is further configured to: output a request message, where the request message is for requesting authentication status information of the terminal device for the slice, and the authentication status information of the terminal device for the slice includes authentication status information of the terminal device for the slice authentication that is initiated by the first network for the slice; and obtain a response message.

It may be understood that for specific implementations of the processing circuit and the interface circuit, refer to the methods shown in FIG. 4A and FIG. 4B to FIG. 8A and FIG. 8B, or refer to steps and/or functions shown in FIG. 9.

In embodiments of this application, the processing circuit may be a general-purpose processor, a digital signal processor, an application-specific integrated circuit, a field programmable gate array, another programmable logic device, a discrete gate or transistor logic device, a discrete hardware component, or the like, and may implement or perform the methods, steps, and logical block diagrams disclosed in embodiments of this application. It may be understood that the descriptions of the processing circuit are applicable to all circuit systems shown below.

It may be understood that the method performed by the interface circuit and the processing circuit above is merely an example. For specific steps performed by the interface circuit and the processing circuit, refer to the method described above.

FIG. 9 is still used. The communication apparatus may be configured to perform an operation performed by the second NF according to the foregoing method embodiments. Alternatively, the communication apparatus may be configured to perform the method performed by the AUSF or the NSSAAF (AAA-P) according to the foregoing method embodiments (as shown in any one or more of FIG. 5A, FIG. 5B, and FIG. 5C to FIG. 8A and FIG. 8B).

FIG. 9 is still used. The communication apparatus may be configured to perform an operation performed by the third NF according to the foregoing method embodiments. Alternatively, the communication apparatus may be configured to perform the method performed by the UDM according to the foregoing method embodiments (as shown in FIG. 7A and FIG. 7B and/or FIG. 8A and FIG. 8B).

For example, the transceiver unit 901 is configured to receive, from a first NF, authentication status information of a terminal device for slice authentication that is initiated by a first network for a slice.

The processing unit 902 is configured to store the authentication status information of the terminal device for the slice authentication that is initiated by the first network for the slice.

Alternatively, the processing unit 902 is configured to control a storage unit (for example, a memory) to store the authentication status information of the terminal device for the slice authentication that is initiated by the first network for the slice.

In a possible implementation, the transceiver unit is further configured to: receive a request message from a fourth NF (or the first NF), where the request message is for requesting authentication status information of the terminal device for the slice, the authentication status information of the terminal device for the slice includes the authentication status information of the terminal device for the slice authentication that is initiated by the first network for the slice, and the fourth NF is an NF in a second network; and send a response message to the fourth NF (or the first NF).

In a possible implementation, when the communication apparatus is a second NF, the transceiver unit 901 is further configured to send, to a third NF, the authentication status information of the terminal device for the slice authentication that is initiated by the first network for the slice.

It may be understood that for specific implementations of the processing unit and the transceiver unit, refer to the methods shown in FIG. 4A and FIG. 4B to FIG. 8A and FIG. 8B. Details are not described herein again.

In some implementations, the communication apparatus may be the second NF in the foregoing method embodiments, and the second NF may be a core device. In this case, the transceiver unit 901 may be implemented by using a transceiver, and the processing unit 902 may be implemented by using a processor. As shown in FIG. 10, the communication apparatus 100 includes the one or more processors 1020 and the transceiver 1010.

For example, the transceiver 1010 is configured to receive, from a first NF, authentication status information of a terminal device for slice authentication that is initiated by a first network for a slice. The processor 1020 is configured to store the authentication status information of the terminal device for the slice authentication that is initiated by the first network for the slice. Alternatively, the processor 1020 is configured to control a memory (for example, the memory 1030) to store the authentication status information of the terminal device for the slice authentication that is initiated by the first network for the slice.

For another example, the transceiver 1010 is further configured to: receive a request message from a fourth NF (or the first NF), where the request message is for requesting authentication status information of the terminal device for the slice, the authentication status information of the terminal device for the slice includes the authentication status information of the terminal device for the slice authentication that is initiated by the first network for the slice, and the fourth NF is an NF in a second network; and send a response message to the fourth NF (or the first NF).

For another example, the transceiver 1010 is further configured to send, to a third NF, the authentication status information of the terminal device for the slice authentication that is initiated by the first network for the slice.

It may be understood that the method performed by the processor and the transceiver above is merely an example. For specific steps performed by the processor and the transceiver, refer to the method described above or the like.

In some other implementations, the communication apparatus may be a circuit system in the second NF. In this case, the processing unit 902 may be implemented by using a processing circuit, and the transceiver unit 901 is implemented by using an interface circuit. As shown in FIG. 11, the communication apparatus may include the processing circuit 1102 and the interface circuit 1101.

For example, the interface circuit is configured to obtain the authentication status information of the terminal device for the slice authentication that is initiated by the first network for the slice; and the processing circuit is configured to store the authentication status information of the terminal device for the slice authentication that is initiated by the first network for the slice. Alternatively, the processing circuit is configured to control a memory outside the circuit system to store the authentication status information of the terminal device for the slice authentication that is initiated by the first network for the slice.

For another example, the interface circuit is further configured to obtain a request message, output a response message, and the like. For another example, the interface circuit is further configured to output the authentication status information of the terminal device for the slice authentication that is initiated by the first network for the slice.

It may be understood that the method performed by the processing circuit and the interface circuit above is merely an example. For specific steps performed by the processing circuit and the interface circuit, refer to the method described above or the like.

It may be understood that for a specific implementation when the communication apparatus is the third NF in FIG. 4A and FIG. 4B or the UDM in FIG. 7A and FIG. 7B or FIG. 8A and FIG. 8B, refer to the second NF, the foregoing method embodiments, or the like. Details are not described herein again.

FIG. 9 is still used. The communication apparatus may be configured to perform an operation performed by the fourth NF according to the foregoing method embodiments. Alternatively, the communication apparatus may be configured to perform the method performed by the AMF according to the foregoing method embodiments (as shown in any one or more of FIG. 5A, FIG. 5B, and FIG. 5C to FIG. 8A and FIG. 8B).

For example, the transceiver unit 901 is configured to receive and send a signal. The processing unit 902 is configured to perform the following via the transceiver unit: sending a request message to a second NF or a third NF, where the request message is for requesting authentication status information of a terminal device for a slice, the authentication status information of the terminal device for the slice includes authentication status information of the terminal device for slice authentication that is initiated by a first network for the slice, and the communication apparatus is an NF in a second network; and receive a response message from the second NF or the third NF.

In a possible implementation, the response message includes any one or more of the following: indication information, where the indication information indicates whether the fourth NF initiates slice authentication with the terminal device, or the indication information indicates whether the terminal device has completed performing slice authentication for the slice; the slice authentication result of the terminal device for the slice; and the authentication status information of the terminal device for the slice authentication that is initiated by the first network for the slice.

It may be understood that for a specific implementation of the fourth NF, refer to the descriptions related to the AMF in the method embodiments. Details are not described herein again.

In some implementations, the communication apparatus may be the fourth NF in the foregoing method embodiments, and the fourth NF may be a core device. In this case, the transceiver unit 901 may be implemented by using a transceiver, and the processing unit 902 may be implemented by using a processor.

In some other implementations, the communication apparatus may be a circuit system in the fourth NF. In this case, the processing unit 902 may be implemented by using a processing circuit, and the transceiver unit 901 is implemented by using an interface circuit.

It may be understood that for specific implementations of the transceiver and the processor, and specific implementations of the processing circuit and the interface circuit, refer to the foregoing method embodiments or specific descriptions of the foregoing communication apparatus including the processing unit and the transceiver unit. Details are not described herein again.

FIG. 9 is still used. The communication apparatus may be configured to perform an operation performed by the authentication server according to the foregoing method embodiments. Alternatively, the communication apparatus may be configured to perform the method performed by the AAA-S according to the foregoing method embodiments (as shown in any one or more of FIG. 5A, FIG. 5B, and FIG. 5C to FIG. 8A and FIG. 8B).

The transceiver unit 901 is configured to receive identification information of a first network, identification information of a slice, and identification information of a terminal device from a first network function NF.

The processing unit 902 is configured to perform slice authentication for the slice based on the identification information of the slice and the identification information of the terminal device.

The transceiver unit 901 is further configured to send a slice authentication result for the slice, the identification information of the slice, and the identification information of the terminal device to the first NF.

In a possible implementation, the processing unit 902 is configured to store authentication status information of the terminal device for the slice authentication that is initiated by the first network for the slice. Alternatively, the processing unit 902 controls a storage unit to store the authentication status information of the terminal device for the slice authentication that is initiated by the first network for the slice.

In a possible implementation, the processing unit 902 is further configured to determine, based on the authentication status information of the terminal device for the slice authentication that is initiated by the first network for the slice, whether to initiate slice authentication with the terminal device for the slice.

In some implementations, the communication apparatus may be the authentication server in the foregoing method embodiments. In this case, the transceiver unit 901 may be implemented by using a transceiver, and the processing unit 902 may be implemented by using a processor.

In some other implementations, the communication apparatus may be a circuit system in the authentication server. In this case, the processing unit 902 may be implemented by using a processing circuit, and the transceiver unit 901 is implemented by using an interface circuit.

It may be understood that for specific implementations of the transceiver and the processor, and specific implementations of the processing circuit and the interface circuit, refer to the foregoing method embodiments or specific descriptions of the foregoing communication apparatus including the processing unit and the transceiver unit. Details are not described herein again. For example, refer to the method performed by the authentication server shown in FIG. 4A and FIG. 4B. For another example, refer to the method performed by the AAA-S shown in FIG. 5A, FIG. 5B, and FIG. 5C to FIG. 8A and FIG. 8B.

Figure 12:
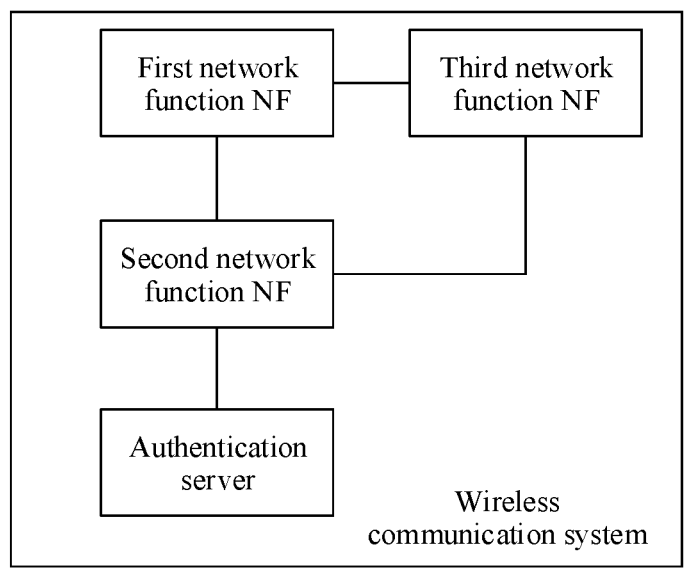
FIG. 12 is a schematic diagram of a wireless communication system according to an embodiment of this application.

FIG. 12 is a schematic diagram of a wireless communication system according to an embodiment of this application. As shown in FIG. 12, the wireless communication system may include a first NF and an authentication server. The first NF may perform the method performed by the first NF shown in FIG. 4A and FIG. 4B; and/or perform the method performed by the AMF shown in any one or more of FIG. 5A, FIG. 5B, and FIG. 5C to FIG. 8A and FIG. 8B. The authentication server may perform the method performed by the authentication server shown in FIG. 4A and FIG. 4B; and/or perform the method performed by the AAA-S shown in any one or more of FIG. 5A, FIG. 5B, and FIG. 5C to FIG. 8A and FIG. 8B.

Further, the wireless communication system may further include a second NF. The second NF may perform the method performed by the second NF shown in FIG. 4A and FIG. 4B; and/or perform the method performed by the AUSF or the NSSAAF (AAA-P) shown in any one or more of FIG. 5A, FIG. 5B, and FIG. 5C to FIG. 8A and FIG. 8B.

Further, the wireless communication system may further include a third NF. The third NF may perform the method performed by the third NF shown in FIG. 4A and FIG. 4B; and/or perform the method performed by the UDM shown in any one or more of FIG. 7A and FIG. 7B and FIG. 8A and FIG. 8B.

Further, the wireless communication system may further include a fourth NF (not shown in FIG. 12). The fourth NF may also perform the method performed by the first NF shown in FIG. 4A and FIG. 4B; and/or perform the method performed by the AMF shown in any one or more of FIG. 5A, FIG. 5B, and FIG. 5C to FIG. 8A and FIG. 8B. For steps or functions performed by each NF, refer to the foregoing embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. All or a part of the units may be selected based on actual requirements to achieve the technical effects of the solutions provided in embodiments of this application.

In addition, function units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions in this application essentially, or the part contributing to the conventional technology, or all or a part of the technical solutions may be implemented in a form of a software product. The computer software product is stored in a readable storage medium and includes several instructions for indicating a computer device (which may be a personal computer, a server, a network device, or the like) to perform all or a part of the steps of the methods described in embodiments of this application. The foregoing readable storage medium includes any medium that can store program code, such as a USB flash drive, a removable hard disk, a read-only memory (read-only memory, ROM), a random access memory (random access memory, RAM), a magnetic disk, or an optical disc.

In addition, this application further provides a computer program. The computer program is configured to implement an operation and/or processing performed by the first NF and/or the AMF shown in FIG. 5A, FIG. 5B, and FIG. 5C to FIG. 8A and FIG. 8B in the slice authentication method provided in this application.

This application further provides a computer program. The computer program is configured to implement an operation and/or processing performed by the second NF and/or the AUSF or the NSSAAF (AAA-P) shown in FIG. 5A, FIG. 5B, and FIG. 5C to FIG. 8A and FIG. 8B in the secure communication method provided in this application.

This application further provides a computer program. The computer program is configured to implement an operation and/or processing performed by the third NF and/or the UDM shown in FIG. 5A, FIG. 5B, and FIG. 5C to FIG. 8A and FIG. 8B in the secure communication method provided in this application.

This application further provides a computer program. The computer program is configured to implement an operation and/or processing performed by the authentication server and/or the AAA-S shown in FIG. 5A, FIG. 5B, and FIG. 5C to FIG. 8A and FIG. 8B in the secure communication method provided in this application.

This application further provides a computer-readable storage medium. The computer-readable storage medium stores computer code. When the computer code is run on a computer, the computer is enabled to perform an operation and/or processing performed by the first NF and/or the AMF shown in FIG. 5A, FIG. 5B, and FIG. 5C to FIG. 8A and FIG. 8B in the secure communication method provided in this application.

This application further provides a computer-readable storage medium. The computer-readable storage medium stores computer code. When the computer code is run on a computer, the computer is enabled to perform an operation and/or processing performed by the second NF and/or the AUSF or the NSSAAF (AAA-P) shown in FIG. 5A, FIG. 5B, and FIG. 5C to FIG. 8A and FIG. 8B in the secure communication method provided in this application.

This application further provides a computer-readable storage medium. The computer-readable storage medium stores computer code. When the computer code is run on a computer, the computer is enabled to perform an operation and/or processing performed by the third NF and/or the UDM shown in FIG. 5A, FIG. 5B, and FIG. 5C to FIG. 8A and FIG. 8B in the secure communication method provided in this application.

This application further provides a computer-readable storage medium. The computer-readable storage medium stores computer code. When the computer code is run on a computer, the computer is enabled to perform an operation and/or processing performed by the authentication server and/or the AAA-S shown in FIG. 5A, FIG. 5B, and FIG. 5C to FIG. 8A and FIG. 8B in the secure communication method provided in this application.

This application further provides a computer program product. The computer program product includes computer code or a computer program. When the computer code or the computer program is run on a computer, an operation and/or processing performed by the first NF and/or the AMF shown in FIG. 5A, FIG. 5B, and FIG. 5C to FIG. 8A and FIG. 8B in the secure communication method provided in this application is implemented.

This application further provides a computer program product. The computer program product includes computer code or a computer program. When the computer code or the computer program is run on a computer, an operation and/or processing performed by the second NF and/or the AUSF or the NSSAAF (AAA-P) shown in FIG. 5A, FIG. 5B, and FIG. 5C to FIG. 8A and FIG. 8B in the secure communication method provided in this application is implemented.

This application further provides a computer program product. The computer program product includes computer code or a computer program. When the computer code or the computer program is run on a computer, an operation and/or processing performed by the third NF and/or the UDM shown in FIG. 5A, FIG. 5B, and FIG. 5C to FIG. 8A and FIG. 8B in the secure communication method provided in this application is implemented.

This application further provides a computer program product. The computer program product includes computer code or a computer program. When the computer code or the computer program is run on a computer, an operation and/or processing performed by the authentication server and/or the AAA-S shown in FIG. 5A, FIG. 5B, and FIG. 5C to FIG. 8A and FIG. 8B in the secure communication method provided in this application is implemented.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A slice authentication method, wherein the method comprises:
receiving, by a first network function (NF) in a first public land mobile network (PLMN), a registration request message from a terminal device; wherein the registration request message comprises identification information of a slice and identification information of the terminal device;
determining, by the first NF, whether to initiate a slice authentication between the terminal device and an authentication server for the slice;
in response to determining to initiate the slice authentication, sending, by the first NF, an identifier of the first PLMN, the identification information of the slice, and the identification information of the terminal device to the authentication server; and
receiving, by the first NF, a slice authentication result for the slice associated with the first PLMN, the identification information of the slice, and the identification information of the terminal device from the authentication server.

2. The method according to claim 1, wherein the sending, by the first network function NF, the identifier of the first PLMN, the identification information of the slice, and the identification information of the terminal device to the authentication server comprises:
sending, by the first NF, the identifier of the first PLMN, the identification information of the slice, and the identification information of the terminal device to the authentication server via a second NF; and
the receiving, by the first NF, a slice authentication result for the slice, the identification information of the slice, and the identification information of the terminal device from the authentication server comprises:
receiving, by the first NE, the slice authentication result for the slice, the identification information of the slice, and the identification information of the terminal device that are sent by the authentication server via the second NF.

3. The method according to claim 2, wherein the method further comprises:
storing, by the second NF, authentication status information of the terminal device for the slice authentication that is initiated by the first PLMN for the slice, wherein the authentication status information of the terminal device for the slice authentication that is initiated by the first PLMN for the slice comprises the slice authentication result for the slice, the identifier of the first PLMN, the identification information of the slice, and the identification information of the terminal device.

4. The method according to claim 2, wherein the method further comprises:
sending, by the second NF to a third NF, authentication status information of the terminal device for the slice authentication that is initiated by the first PLMN for the slice;
receiving, by the third NF, the authentication status information of the terminal device for the slice authentication that is initiated by the first PLMN for the slice; and
storing, by the third NF, the authentication status information of the terminal device for the slice authentication that is initiated by the first PLMN for the slice.

5. The method according to claim 4, wherein the method further comprises:
sending, by a fourth NF, a request message to the second NF or the third NF, wherein the request message requests authentication status information of the terminal device for the slice, the authentication status information of the terminal device for the slice comprises the authentication status information of the terminal device for the slice authentication that is initiated by the first PLMN for the slice, and the fourth NF is an NF in a second network, and
sending, by the second NF or the third NF, a response message to the fourth NF in response to the request message.

6. The method according to claim 5, wherein the response message comprises at least one of the following:
indication information, wherein the indication information indicates whether the fourth NF initiates slice authentication with the terminal device, or the indication information indicates whether the terminal device has completed performing slice authentication for the slice;
the slice authentication result of the terminal device for the slice; or
the authentication status information of the terminal device for the slice authentication that is initiated by the first PLMN for the slice.

7. A slice authentication method, wherein the method comprises:
receiving, by an authentication server, an identifier of a first public land mobile network (PLMN), identification information of a slice, and identification information of a terminal device from a first network function (NF) in the first PLMN;

determining, by the authentication server, whether to a slice authentication with the terminal device for the slice is needed based on the identifier of the first PLMN, the identification information of the slice, and the identification information of the terminal device;

in response to determining that the slice authentication with the terminal device for the slice is needed, performing, by the authentication server, slice authentication for the slice based on the identification information of the slice and the identification information of the terminal device; and sending, by the authentication server, a slice authentication result for the slice associated with the first PLMN, the identification information of the slice, and the identification information of the terminal device to the first NF.

8. The method according to claim 7, wherein the method further comprises:

storing, by the authentication server, authentication status information of the terminal device for slice authentication that is initiated by the first PLMN for the slice, wherein the authentication status information of the terminal device for the slice authentication that is initiated by the first PLMN for the slice comprises the slice authentication result for the slice, the identifier of the first PLMN, the identification information of the slice, and the identification information of the terminal device.

9. The method according to claim 7, wherein the method further comprises:

determining, by the authentication server based on authentication status information of the terminal device for the slice authentication that is initiated by the first PLMN for the slice, whether the slice authentication with the terminal device for the slice is needed.

10. A wireless communication system, wherein the system comprises:

a first network function (NF) in a first public land mobile network (PLMN), wherein the first NF comprises:
at least one first processor; and
one or more first memories coupled to the at least one first processor and storing first programming instructions for execution by the at least one first processor to cause the first NF to:
receive a registration request message from a terminal device; wherein the registration request message comprises identification information of a slice and identification information of the terminal device;
determine whether to initiate slice authentication between the terminal device and an authentication server for the slice, wherein
in response to determining to initiate the slice authentication, send an identifier of the first PLMN, the identification information of the slice, and the identification information of the terminal device to the authentication server; and
receive a slice authentication result for the slice associated with the first PLMN, the identification information of the slice, and the identification information of the terminal device from the authentication server.

11. The system according to claim 10, wherein the first programming instructions, when executed by the at least one first processor, cause the first NF to:

send the identifier of the first PLMN, the identification information of the slice, and the identification information of the terminal device to the authentication server via a second NF; and receive the slice authentication result for the slice, the identification information of the slice, and the identification information of the terminal device that are sent by the authentication server via the second NF.

12. The system according to claim 11, wherein the system further comprises:

the second NF, wherein the second NF comprises:
at least one second processor; and
one or more second memories coupled to the at least one second processor and storing second programming instructions for execution by the at least one second processor to cause the second NF to:
store authentication status information of the terminal device for the slice authentication that is initiated by the first PLMN for the slice, wherein the authentication status information of the terminal device for the slice authentication that is initiated by the first PLMN for the slice comprises the slice authentication result for the slice, the identifier of the first PLMN, the identification information of the slice, and the identification information of the terminal device.

13. The system according to claim 12, wherein the second programming instructions, when executed by the at least one second processor, cause the second NF to:

send, to a third NF, authentication status information of the terminal device for the slice authentication that is initiated by the first PLMN for the slice; and the system further comprises:
the third NF, wherein the third NF comprises:
at least one third processor; and
one or more third memories coupled to the at least one third processor and storing third programming instructions for execution by the at least one third processor to cause the third NF to:
receive the authentication status information of the terminal device for the slice authentication that is initiated by the first PLMN for the slice; and
store the authentication status information of the terminal device for the slice authentication that is initiated by the first PLMN for the slice.

14. The system according to claim 13, wherein the system further comprises:

a fourth NF, wherein the fourth NF comprises:
at least one fourth processor; and
one or more fourth memories coupled to the at least one fourth processor and storing fourth programming instructions for execution by the at least one fourth processor to cause the fourth NF to:
send a request message to the second NF or the third NF, wherein the request message requests authentication status information of the terminal device for the slice, the authentication status information of the terminal device for the slice comprises the authentication status information of the terminal device for the slice authentication that is initiated by the first PLMN for the slice, and the fourth NF is an NF in a second network, wherein at least one of the following is true:

the second programming instructions, when executed by the at least one second processor, cause the second NF to send a response message to the fourth NF in response to the request message; or the third programming instructions, when executed by the at least one third processor, cause the third NF to send a response message to the fourth NF in response to the request message.

15. The system according to claim 14, wherein the response message comprises at least one of the following:
  indication information, wherein the indication information indicates whether the fourth NF initiates slice authentication with the terminal device, or the indication information indicates whether the terminal device has completed performing slice authentication for the slice;
  the slice authentication result of the terminal device for the slice; or
  the authentication status information of the terminal device for the slice authentication that is initiated by the first PLMN for the slice.

16. The system according to claim 10, wherein the system further comprises:
  the authentication server, wherein the authentication server comprises:
    at least one another processor; and
    one or more another memories coupled to the at least one another processor and storing another programming instructions for execution by the at least one another processor to cause the authentication server to:
    receive the identifier of the first PLMN, the identification information of the slice, and the identification information of the terminal device from the first NF, wherein
    perform slice authentication for the slice based on the identification information of the slice and the identification information of the terminal device; and
    send the slice authentication result for the slice, the identification information of the slice, and the identification information of the terminal device to the first NF.

17. The system according to claim 16, wherein the another programming instructions, when executed by the at least one another processor, cause the authentication server to store authentication status information of the terminal device for the slice authentication that is initiated by the first PLMN for the slice.

18. The system according to claim 16, wherein the another programming instructions, when executed by the at least one another processor, cause the authentication server to determine, based on authentication status information of the terminal device for the slice authentication that is initiated by the first PLMN for the slice, whether to initiate slice authentication with the terminal device for the slice.

19. An authentication server, comprising:
  at least one processor; and
  at least one memory storing instructions and the instructions, when executed by the at least one processor, cause the authentication server to:
  receive an identifier of a first public land mobile network (PLMN), identification information of a slice, and identification information of a terminal device from a first network function (NF) in the first PLMN;
  determine whether to a slice authentication with the terminal device for the slice is needed based on the identifier of the first PLMN, the identification information of the slice, and the identification information of the terminal device;
  in response to determining that the slice authentication with the terminal device for the slice is needed, perform slice authentication for the slice based on the identification information of the slice and the identification information of the terminal device; and
  send a slice authentication result for the slice associated with the first PLMN, the identification information of the slice, and the identification information of the terminal device to the first NF.

20. The authentication server according to claim 19, wherein the instructions further cause the authentication server to determine, based on authentication status information of the terminal device for the slice authentication that is initiated by the first PLMN for the slice, whether the slice authentication with the terminal device for the slice is needed.

* * * * *